United States Patent
Takagi

(10) Patent No.: US 9,581,861 B2
(45) Date of Patent: Feb. 28, 2017

(54) PHASE DIFFERENCE FILM, POLARIZING PLATE, AND LIQUID CRYSTAL DISPLAY DEVICE

(71) Applicant: Konica Minolta, Inc., Tokyo (JP)

(72) Inventor: Takahiro Takagi, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 357 days.

(21) Appl. No.: 14/354,213

(22) PCT Filed: Nov. 1, 2012

(86) PCT No.: PCT/JP2012/007004
§ 371 (c)(1),
(2) Date: Apr. 25, 2014

(87) PCT Pub. No.: WO2013/065307
PCT Pub. Date: May 10, 2013

(65) Prior Publication Data
US 2014/0326930 A1  Nov. 6, 2014

(30) Foreign Application Priority Data

Nov. 1, 2011  (JP) .................. 2011-240155

(51) Int. Cl.
| | | |
|---|---|---|
| G02F 1/13363 | (2006.01) | |
| G02B 5/30 | (2006.01) | |
| C08J 5/18 | (2006.01) | |
| C08K 5/103 | (2006.01) | |
| C08K 5/00 | (2006.01) | |

(52) U.S. Cl.
CPC ............ G02F 1/13363 (2013.01); C08J 5/18 (2013.01); C08K 5/0016 (2013.01); C08K 5/103 (2013.01); G02B 5/3083 (2013.01); C08J 2301/12 (2013.01); C08L 2205/02 (2013.01)

(58) Field of Classification Search
USPC .................. 359/489.07; 252/582; 428/1.33
See application file for complete search history.

(56) References Cited

U.S. PATENT DOCUMENTS 8,697,201 B2 * 4/2014 Kawai .................... B29C 41/24
264/1.34

FOREIGN PATENT DOCUMENTS

| JP | 07-1519140 | 6/1995 |
|---|---|---|
| JP | 08-094838 | 4/1996 |
| JP | 2001-166146 A | 6/2001 |
| JP | 2001-188130 A | 7/2001 |
| JP | 2001-296422 A | 10/2001 |
| JP | 2004-177642 A | 6/2004 |
| JP | 2006-323152 A | 11/2006 |
| JP | 2007003679 | * 1/2007 |
| JP | 2007-131681 A | 5/2007 |
| JP | 2012-002981 A | 1/2012 |

* cited by examiner

*Primary Examiner* — Monique Peets
(74) *Attorney, Agent, or Firm* — Lucas & Mercanti, LLP

(57) ABSTRACT

The purpose of the present invention is to provide a cellulose acetate film having excellent adhesion to a polarizer, and in which there is minimal change in retardation with respect to residual solvent during film stretching. This phase difference film contains cellulose acetate α having a degree of acetyl substitution of 2.1 or less, cellulose acetate β having a degree of acetyl substitution of 2.3-2.5, and a compound having a van der Waals volume of 500 $Å^3$ to 1000 $Å^3$ in the amount of 5-10 mass % with respect to the total amount of the cellulose acetate α and the cellulose acetate β, and the phase difference film is stretched.

9 Claims, 1 Drawing Sheet

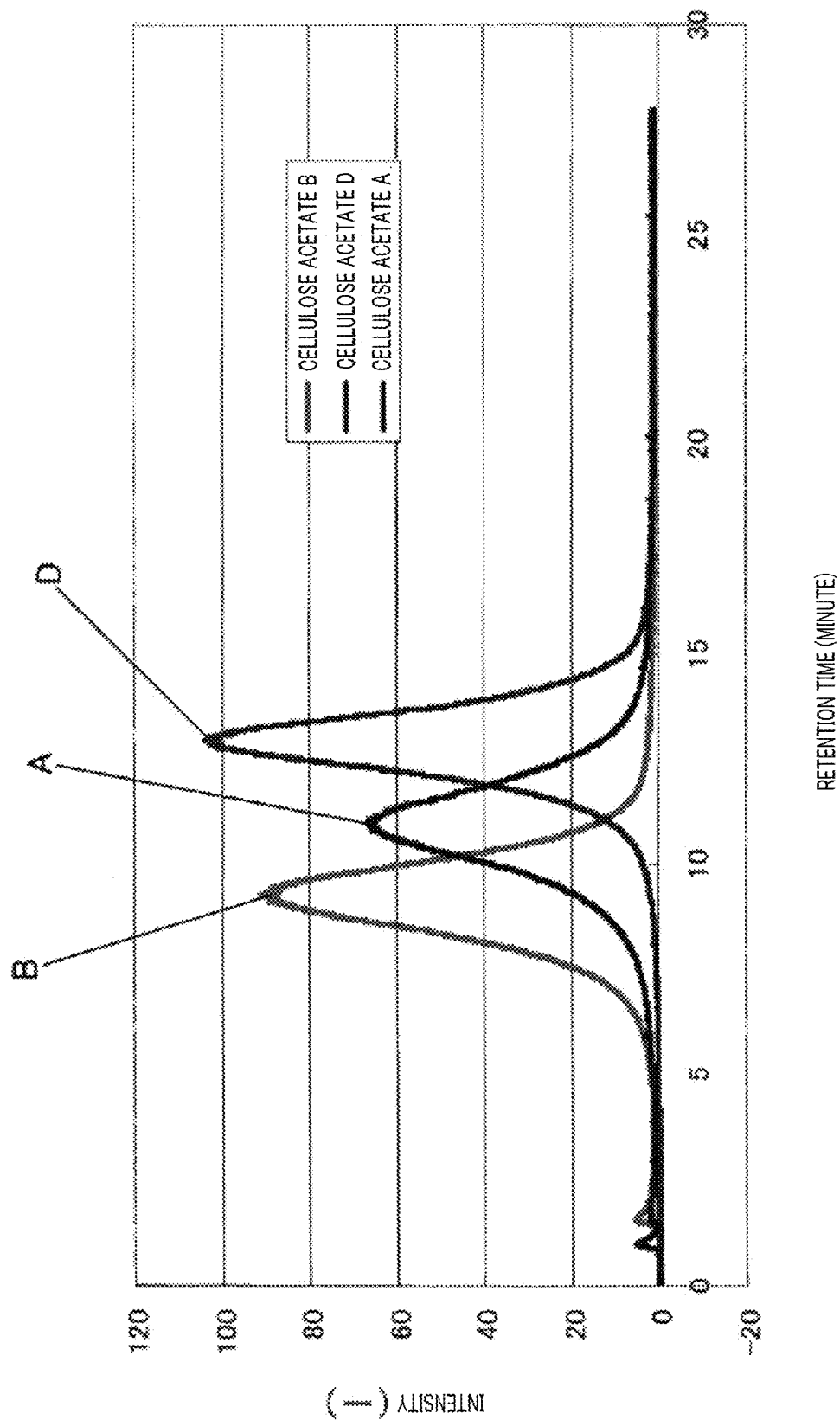

PHASE DIFFERENCE FILM, POLARIZING PLATE, AND LIQUID CRYSTAL DISPLAY DEVICE

CROSS REFERENCE TO RELATED APPLICATION

This Application is a 371 of PCT/JP2012/007004 filed on Nov. 1, 2012 which, in turn, claimed the priority of Japanese Patent Application No. JP2011-240155 filed on Nov. 1, 2011 both applications are incorporated herein by reference.

TECHNICAL FIELD

The present invention relates to a retardation film, a polarizing plate, and a liquid crystal display device. In particular, the present invention relates to a retardation film obtained by stretching a cellulose acetate film containing cellulose acetate having a low degree of substitution, a polarizing plate, and a liquid crystal display device.

BACKGROUND ART

In order to improve the viewing angle and avoid color changes in liquid-crystal display devices, retardation films that exhibit a specific retardation value (hereinafter, R value) have been used either singly or in combination.

Cellulose acetate is known to be advantageous as the main material of the retardation film and the optical characteristics of the film is known to depend on the degree of acetyl substitution of the cellulose acetate. In particular, cellulose acetate having a low degree of substitution has a high intrinsic birefringence, and therefore, by reducing the degree of acetyl substitution it is considered that the cellulose acetate can develop high optical characteristics suitable as a VA retardation film. As described in PTLs 1 to 4, a film of cellulose acetate can be directly laminated to a polarizer containing polyvinyl alcohol as a principal component by immersing the film in an alkaline aqueous solution to saponify and make the surface of the film hydrophilic. For this reason, the cellulose acetate films have been utilized as films that exhibit a retardation compensating function for a polarizer (hereinafter, retardation film).

A polarizer to which a retardation film is laminated is incorporated together with a liquid crystal cell when a liquid crystal display device is manufactured. Since the retardation film is disposed between the polarizer and the liquid crystal cell at this time, the optical characteristics of the film greatly affects the visibility of the liquid crystal display device. The retardation film is required to exhibit stable optical characteristics against various environmental changes.

For suitable development of optical characteristics, it is necessary to reduce the degree of acetyl substitution of a cellulose ester. However, when the degree of acetyl substitution of the cellulose ester is reduced, hydrogen bonding components increase in number due to the increased number of hydroxy groups thus resulting in a large variation in the development of optical characteristics. Particularly, this raises the following problem: "during film stretching optical characteristics are prone to vary in response to a change in the amount of residual solvent in the retardation film". In recent years, with the wider viewing angle and higher image quality of the liquid crystal display device, high retardation compensation is increasingly required, and it has been required in the art to improve retardation compensation.

It has been proposed to use a film containing cellulose acetate having a high degree of acetyl substitution in order to stably develop optical characteristics even if the amount of residual solvent in the film changes when the film is stretched (for example, see PTL 5).

CITATION LIST

Patent Literature

PTL 1
Japanese Patent Application Laid-Open No. 7-151914
PTL 2
Japanese Patent Application Laid-Open No. 8-94838
PTL 3
Japanese Patent Application Laid-Open No. 2001-166146
PTL 4
Japanese Patent Application Laid-Open No. 2001-188130
PTL 5
Japanese Patent Application Laid-Open No. 2001-296422

SUMMARY OF INVENTION

Technical Problem

As described above, when the degree of acetyl substitution of the cellulose ester is increased, the development of optical characteristics is stable against a change in the residual solvent amount during film stretching. However, desired optical characteristics are not readily obtained. An object of the present invention is therefore to provide a cellulose acetate film whose retardation variation in response to changes in the residual solvent amount during film stretching is small and that exhibits excellent laminating property to a polarizer. Another object of the present invention is to provide a highly reliable polarizing plate and liquid crystal display device which include the cellulose acetate film as a retardation film.

Solution to Problem

The inventors have made intensive studies to overcome the above-mentioned problems. As a result, the inventors have established that the above-mentioned problems can be overcome using a retardation film containing the following cellulose acetate, and completed the present invention described below.

[1] A retardation film including:
cellulose acetate α having a degree of acetyl substitution of 2.1 or less:
cellulose acetate β having a degree of acetyl substitution of 2.3 to 2.5; and
a compound having a van der Waals volume of 500 $Å^3$ to 1,000 $Å^3$ in an amount of 5 to 10 wt % relative to the total of the cellulose acetate α and the cellulose acetate β,
wherein the retardation film is stretched.
[2] The retardation film according to [1], wherein the compound having a van der Waals volume of 500 $Å^3$ to 1,000 $Å^3$ is a compound represented by any of general formulas (I) to (V):

[Formula 1]

General Formula (I)

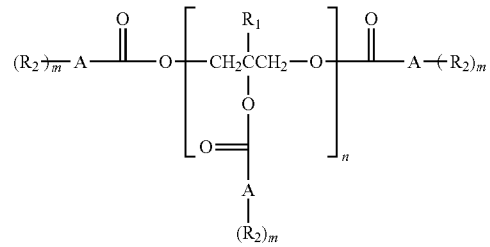

wherein A represents an aromatic ring or a cyclohexyl ring; $R_1$ represents a hydrogen atom or an alkyl substituent; $R_2$ represents an alkyl substituent or an alkoxyl substituent; m represents an integer of 0 or more, n represents 2 to 4,

[Formula 2]

General Formula (II)

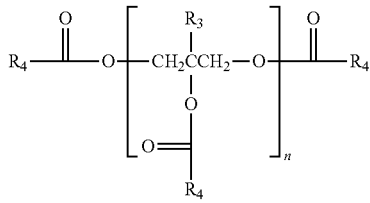

wherein $R_3$ represents a hydrogen atom or an alkyl substituent: $R_4$ represents an alkyl substituent; and n represents 2 to 4,

[Formula 3]

General Formula (III)

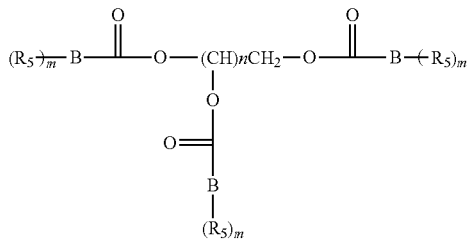

wherein B represents an aromatic ring or a cyclohexyl ring; $R_5$ represents an alkyl substituent or an alkoxyl substituent; m represents an integer of 0 or more; and n represents 4 to 6,

[Formula 4]

General Formula (IV)

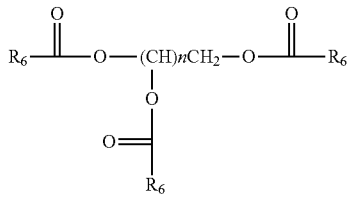

wherein $R_6$ represents an alkyl substituent; and n represents 4 to 6,

[Formula 5]

General Formula (V)

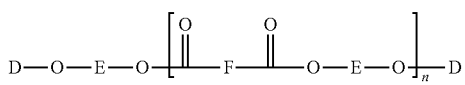

wherein D is an aryl carboxylic acid residue, an alkyl carboxylic acid residue, or a hydrogen atom; E is a $C_{2-12}$ alkylene glycol residue, a $C_{6-12}$ aryl glycol residue, or a $C_{4-12}$ oxyalkylene glycol residue; F represents a $C_{4-12}$ alkylene dicarboxylic acid residue or a $C_{6-12}$ aryl dicarboxylic acid residue; and n represents 2 to 4.

[3] The retardation film according to [1] or [2], wherein an in-plane retardation Re measured at a wavelength of 590 nm is 25 nm≤|Re|≤75 nm; and when a decrease amount of Re in the case where a residual solvent amount at the start of stretching is increased by X (%) is defined as Y (nm), Y/X is 1 nm/% to 3 nm/%.

[4] The retardation film according to any one of [1] to [3], wherein the retardation film has a width of 700 to 3,000 mm.
[5] A polarizing plate including a retardation film according to any one of [1] to [4]. [6] A liquid crystal display device including a retardation film according to any one of [1] to [4].

Advantageous Effects of Invention

The present invention can provide a cellulose acetate film in which the width of variation in a r eardation value in response to a change in the residual solvent amount of the film during stretching is minimal, which feature cannot be achieved by conventional cellulose acetate films. In addition, adhesion to a hydrophilic film can be increased by treating the surface of the cellulose acetate film with alkali. Therefore, the cellulose acetate film as a retardation film can be laminated to a polarizer to produce a polarizing plate.

BRIEF DESCRIPTION OF DRAWINGS

FIG. 1 illustrates measurements of liquid chromatographs of cellulose acetates used in Examples.

DESCRIPTION OF EMBODIMENTS

Hereinafter, the present invention will be described in detail. As used herein, the term "to" used for numerical ranges is used to include numerical values indicated before and after "to" as a lower limit value and an upper limit value.
[Retardation Film]
A retardation film of the present invention (hereinafter also referred to as a film of the present invention) contains cellulose acetate α having a degree of acetyl substitution of 2.1 or less: cellulose acetate β having a degree of acetyl substitution of 2.3 to 2.5; and a compound having a van der Waals volume of 500 Å$^3$ to 1,000 Å$^3$, and the retardation film is stretched.

The retardation film contains the cellulose acetate α having a degree of acetyl substitution of 2.1 or less, and can thereby provide the retardation film with adhesion to a hydrophilic film.

Further, the retardation film of the present invention contains the compound having a van der Waals volume of 500 Å$^3$ to 1,000 Å$^3$ and is stretched. Therefore, even when technically unavoidable variation in the residual solvent amount occurs during stretching in a casting process, influence on the optical characteristics of the stretched film (retardation film) can be limited and thus a variation in the development of optical characteristics can be reduced.

Thus, the retardation film of the present invention has high adhesion to a hydrophilic film and very small variation in optical characteristics.
(Cellulose Acetate)
Examples of celluloses as raw materials for the cellulose acetate α and the cellulose acetate β contained in the retardation film of the present invention include cotton linter and wood pulp (hardwood pulp, softwood pulp). Any cellulose acetate obtained from any of the raw material celluloses may be used, and a mixture of the cellulose acetates may be optionally used. For example, the details of the raw material celluloses are described in "Plastic Zairyo Kouza (17), Cellulosic Resin" (written by Marusawa and Uda, published by Nikkan Kogyo Shimbun Ltd., 1970); and Hatsumei Kyokai Disclosure Bulletin 2001-1745 (pp. 7-8).

When the cellulose acetate α and the cellulose acetate β contained in the retardation film of the present invention are obtained from the wood pulp, such cellulose acetate α and cellulose acetate β are preferable from the viewpoint of laminating property with a polarizer.

The glucose units that are joined by β-1,4 linkages to constitute cellulose each contain free hydroxyl groups at the 2-, 3- and 6-positions. Cellulose acetate is a polymer in which some or all of the hydroxyl groups of the cellulose are acetylated. The degree of acetyl substitution means the proportion of acetylated hydroxyl groups in cellulose at the 2-, 3- and 6-positions (100% acetylation is defined as a degree of substitution of 3).

The degrees of acetyl substitution of the cellulose acetate α and cellulose acetate β contained in the retardation film of the present invention may each satisfy the above-mentioned ranges, and the cellulose acetate α and the cellulose acetate β are not particularly limited. The content ratio of the cellulose acetate α and cellulose acetate β is preferably α:β=1:99 to 3:97.

The degree of acetyl substitution of the cellulose acetate α more preferably satisfies 1.5 to 2.1, and more preferably 1.8 to 2.1. The cellulose acetate having the degree of acetyl substitution falling under this range more readily exhibits adhesion to a hydrophilic film.

As described above, the retardation film of the present invention contains the cellulose acetate α and the cellulose acetate β. The degrees of acetyl substitution of the cellulose acetates contained in the retardation film can be confirmed by liquid chromatography, as described in Examples to be mentioned below.

The cellulose acetate can be usually synthesized through (1) an activation step of activating cellulose, (2) an acetification step of esterifying cellulose with acetic acid, and (3) a saponification-aging step of hydrolyzing the obtained cellulose triacetate to adjust an acetification degree. The cellulose acetate containing the cellulose acetate α and the cellulose acetate β can be obtained by, for example, adjusting the pH and temperature condition of an acetic acid-containing aqueous solution in (3) the saponification-aging step of the synthesis process.

When an acid anhydride or an acid chloride is used as an acetylating agent for acetylating cellulose, an organic acid such as acetic acid or methylene chloride is used as a reaction solvent, that is, an organic solvent.

When the acetylating agent is an acid anhydride, a protic catalyst such as sulfuric acid is preferably used as an acetylating catalyst. When the acetylating agent is an acid chloride (for example, CH$_3$COCl), a basic compound is used.

The most common industrial method for synthesizing fatty acid esters of celluloses is a method including acylating cellulose with fatty acids corresponding to an acetyl group and other acyl groups (such as acetic acid, propionic acid and valeric acid) or mixed organic acid components containing acid anhydrides of those acids. The cellulose acetate used in the present invention can be synthesized by, for example, a method described in Japanese Patent Application Laid-Open No. 10-45804.

(Compound Having Van Der Waals Volume of 500 Å$^3$ to 1,000 Å$^3$)

The retardation film of the present invention contains a compound having a van der Waals volume of 500 Å$^3$ to 1,000 Å$^3$.

In the manufacture of the retardation film of the present invention, it is required to reduce the variation in the retardation value of the retardation film in response to the change in the residual solvent amount during film stretching. In order to limit the variation in the retardation value of the retardation film in response to a change in the residual solvent amount in the film during stretching, it is effective to reduce the intermolecular hydrogen bonding action of the cellulose acetate in the film. In order to reduce the hydrogen bonding action, the degree of acetyl substitution may be increased. However, when the degree of acetyl substitution is increased, it becomes difficult to obtain a desired retardation value. That is, in order to stably obtain a desired retardation value, it is necessary to achieve both seemingly mutually conflicting needs: reducing the degree of acetyl substitution of the cellulose acetate, and limiting the hydrogen bonding action of the cellulose acetate.

In order to limit the hydrogen bonding action of the cellulose acetate contained in the retardation film, the compound having a van der Waals volume of 500 Å$^3$ to 1,000 Å$^3$ is added. When the van der Waals volume deviates from this range, the retardation film exhibits an insufficient optical compensation performance.

The cause of insufficient optical compensation performance remains elusive. However, it is considered that when the van der Waals volume is less than 500 Å$^3$, the hydrogen bonding action of the cellulose acetate cannot be limited; and when the van der Waals volume is more than 1,000 Å$^3$, the angle of rotation of the molecule of the compound is limited resulting in reduced degree of freedom, which increases the crystallinity of the compound itself, i.e., reduces its amorphousness Thus, the compound to be added to the cellulose acetate constituting the retardation film is optimized in a three-dimensional viewpoint, and thereby the high retardation developing property of the retardation film and the variation in the retardation value in response to the change in the residual solvent amount of the film during film stretching can be limited.

The van der Waals volume is a parameter obtained by using simulation software Cerius 2 manufactured by Accelrys Software Inc. The van der Waals volume is defined as a Volume value calculated using Connoly Surface by optimizing the molecular structure via MM calculation using Dreiding Force Field.

Examples of the compound having a van der Waals volume of 500 Å$^3$ to 1,000 Å$^3$ are represented by the following general formulas (I to IV).

[Formula 6]

General Formula (I)

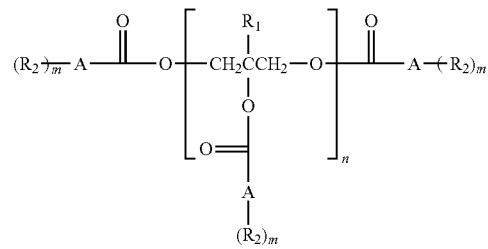

In general formula (I), A represents an aromatic ring (for example, $C_{6-10}$) or a cyclohexyl ring. $R_1$ represents a hydrogen atom or an alkyl substituent (for example, $C_{1-10}$); and $R_2$ is a substituent attached to the aromatic ring or cyclohexyl ring of A, and represents an alkyl substituent (for example, $C_{1-10}$) or an alkoxyl substituent (for example, $C_{1-10}$). m represents the number of the substituents $R_2$ attached to the aromatic ring or cyclohexyl ring of A, and represents an integer of 0 or more, and preferably 0 to 3. n represents 2 to 4.

[Formula 7]

General Formula (II)

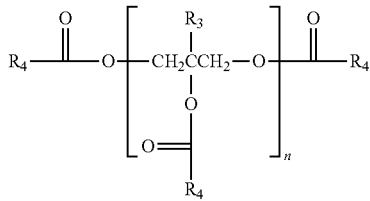

In general formula (II), $R_3$ represents a hydrogen atom or an alkyl substituent (for example, $C_{1-10}$), and $R_4$ represents an alkyl substituent (for example, $C_{1-10}$). n represents 2 to 4.

[Formula 8]

General Formula (III)

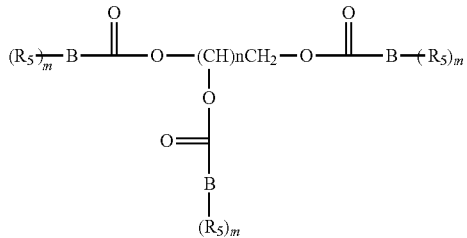

In general formula (II), B represents an aromatic ring or a cyclohexyl ring; $R_5$ is a substituent attached to the aromatic ring or cyclohexyl ring of B, and represents an alkyl substituent (for example, $C_{1-10}$) or an alkoxyl substituent (for example, $C_{1-10}$). m represents the number of the substituents $R_5$ attached to the aromatic ring or cyclohexyl ring of B, and represents an integer of 0 or more, and preferably 0 to 3. n represents 4 to 6.

[Formula 9]

General Formula (IV)

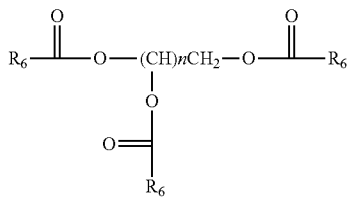

In general formula (IV), $R_6$ represents an alkyl substituent (for example, $C_{1-10}$). n represents 4 to 6.

The compounds represented by general formulas (I to IV) are esterified products of aliphatic polyalcohols having a valence of three or more and monocarboxylic acids.

Examples of preferable aliphatic polyalcohols include, but not limited to, adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Particularly preferable are triethylene glycol, tetraethylene glycol, dipropylene glycol, tripropylene glycol, sorbitol, trimethylolpropane, xylitol, and the like.

Monocarboxylic acids to be used for polyhydric alcohol esters are not especially limited, and usable are well-known aliphatic monocarboxylic acids, alicyclic monocarboxylic acids, aromatic monocarboxylic acids and the like. Use of the alicyclic monocarboxylic acids and aromatic monocarboxylic acids is preferable from the viewpoint of improvement of the moisture permeability and the retainability.

Examples of preferable aliphatic monocarboxylic acids include, but not particularly limited to, fatty acids having a $C_{1-32}$ straight chain or side chain. The number of carbon atoms is more preferably 1 to 20, and particularly preferably 1 to 10. The addition of acetic acid is preferable since the compatibility with the cellulose ester is increased, and mixing acetic acid and other monocarboxylic acids and using the mixture is also preferable.

Examples of preferable aliphatic monocarboxylic acids include saturated fatty acids such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids such as undecylenic acid, oleic acid, sorbic acid, linolic acid, linolenic acid and arachidonic acid.

Examples of preferable alicyclic monocarboxylic acids include cyclopentanecarboxylic acid, cyclohexanecarboxylic acid, cyclooctanecarboxylic acid and derivatives thereof. Examples of preferable aromatic monocarboxylic acids include benzoic acid, aromatic monocarboxylic acids in which one to three alkyl groups or alkoxy groups such as a methoxy group and an ethoxy group are incorporated to a benzene ring of benzoic acid such as toluic acid, and aromatic monocarboxylic acids having two or more benzene rings such as biphenylcarboxylic acid, naphthalenecarboxylic acid, and tetralincarboxylic acid, and derivatives thereof. Benzoic acid is particularly preferable.

One or a mixture of carboxylic acids may be used for the polyhydric alcohol esters. All of the OH groups of the polyhydric alcohol may be esterified or some of the OH groups may remain intact.

The molecular weights of the compounds represented by general formulas (I to IV) are preferably 500 to 1,200. A higher molecular weight is preferable since the compounds hardly volatilize: and a lower molecular weight is preferable from the viewpoint of the moisture permeability and the compatibility with the cellulose ester.

Specific examples of the compounds represented by the general formulas (I to IV) will be given below, but the present invention is not limited to the following specific examples at all.

[Formula 10]
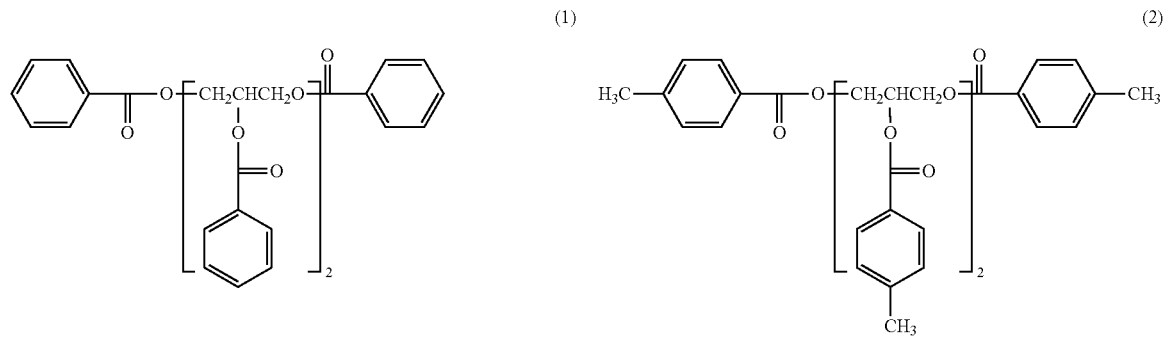
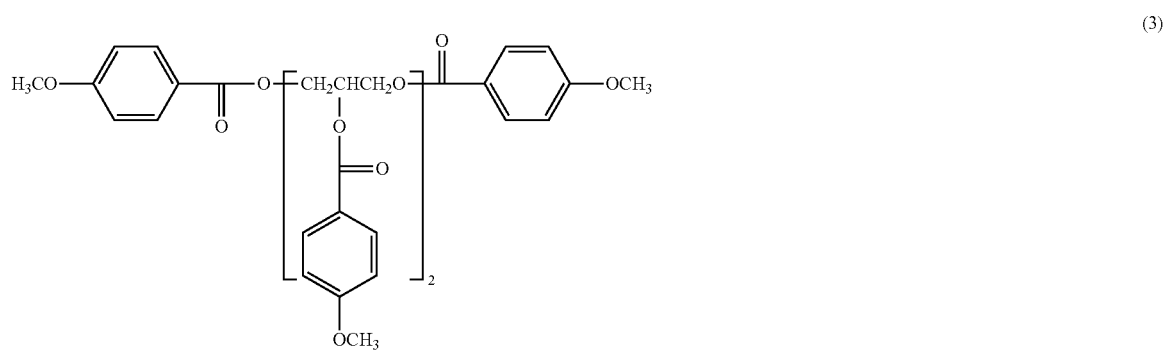
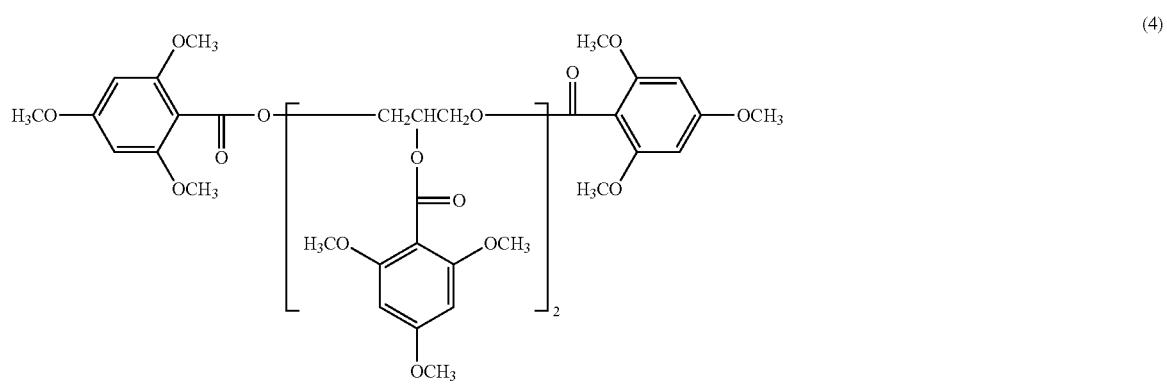
[Formula 11]
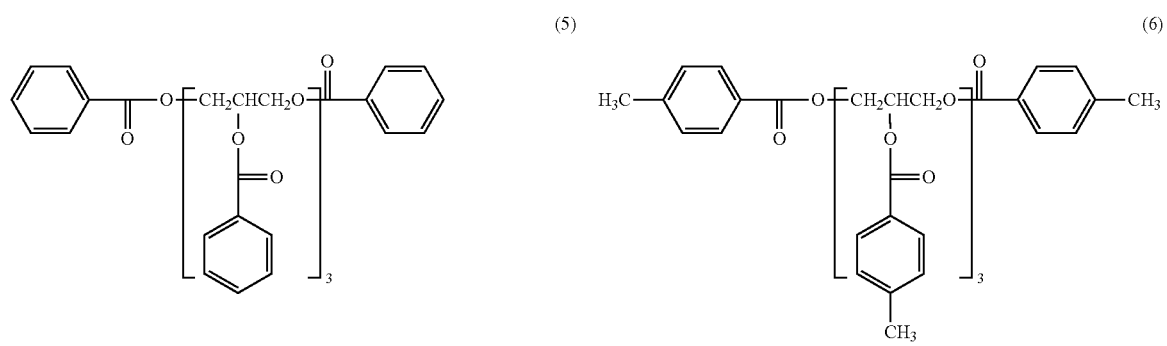

-continued
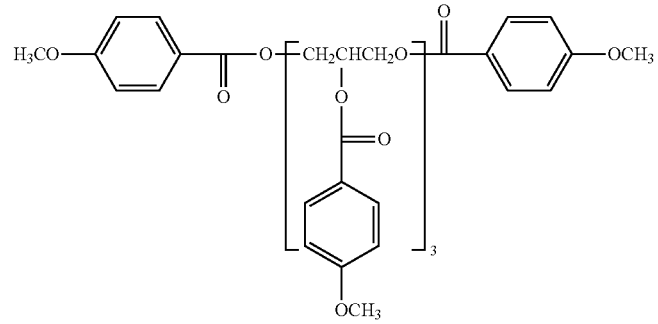
(7)
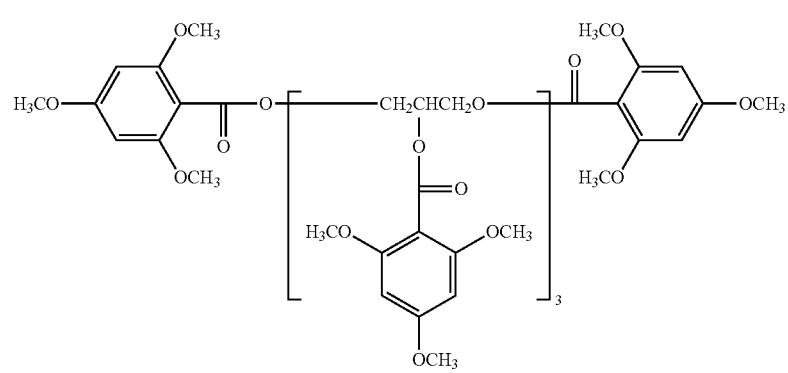
(8)
[Formula 12]
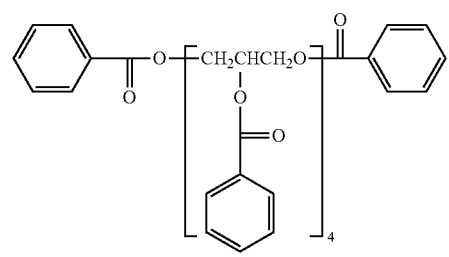
(9)
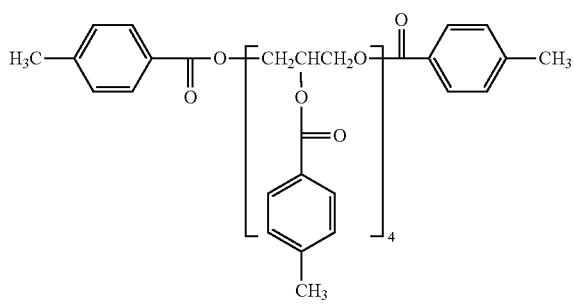
(10)
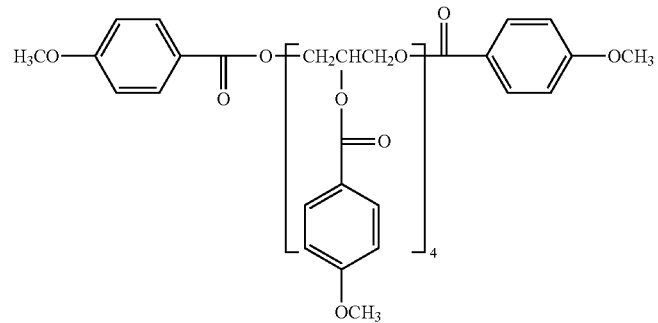
(11)

-continued
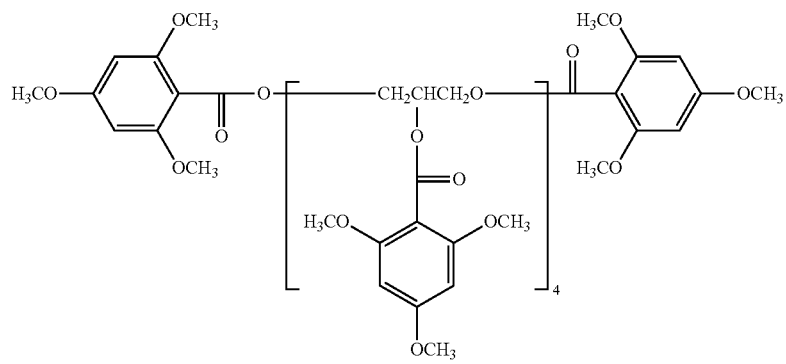
(12)
[Formula 13]
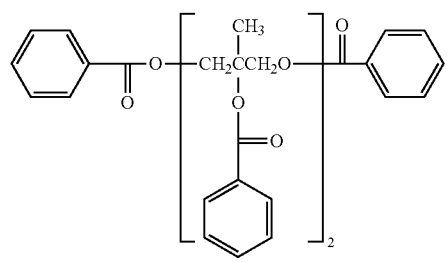
(13)
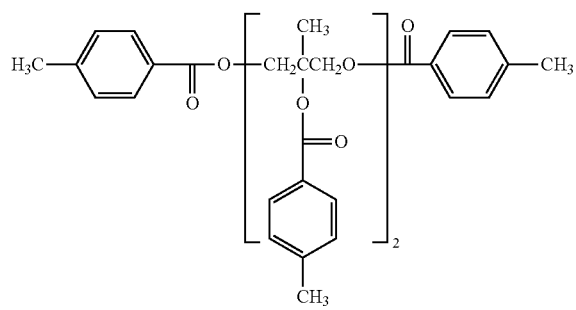
(14)
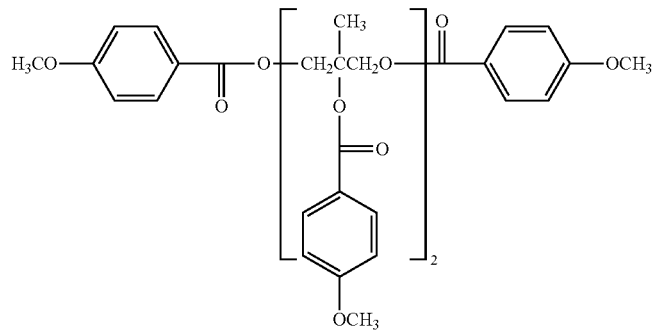
(15)
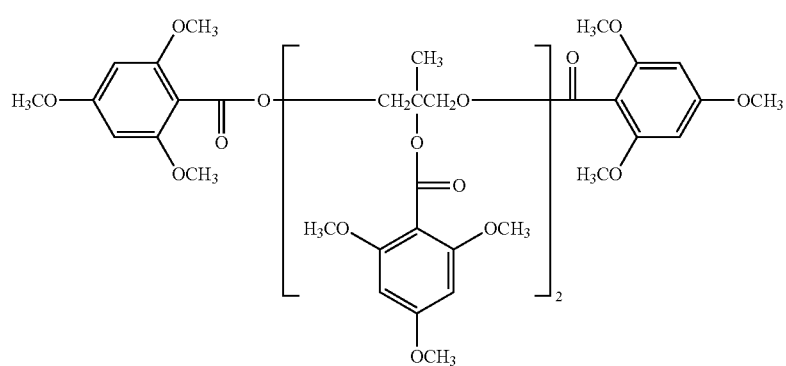
(16)

[Formula 14]
(17)
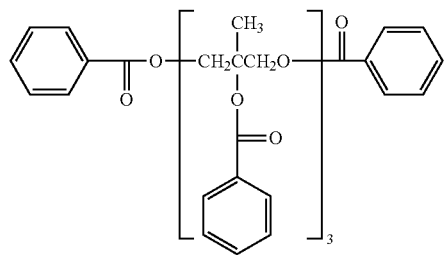
(18)
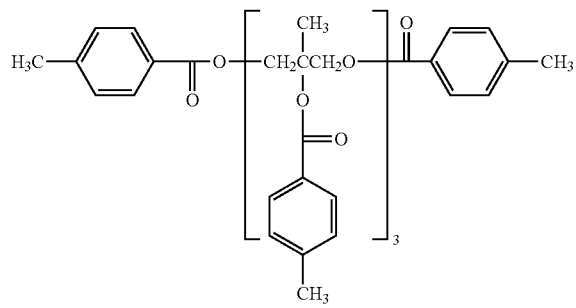
(19)
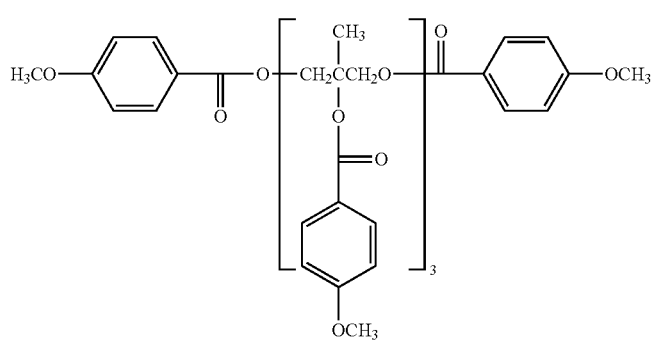
(20)
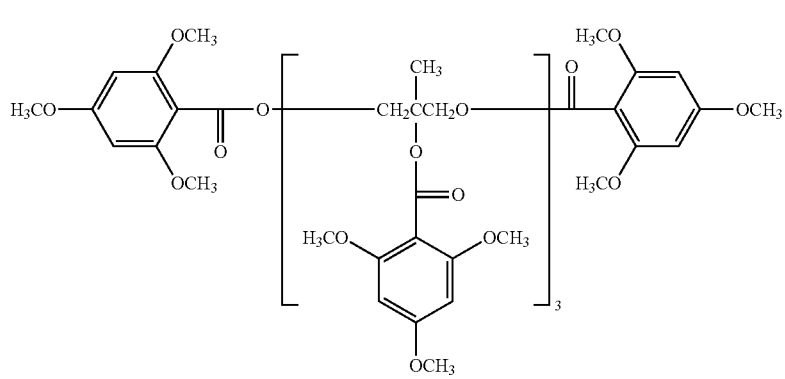
[Formula 15]
(21)
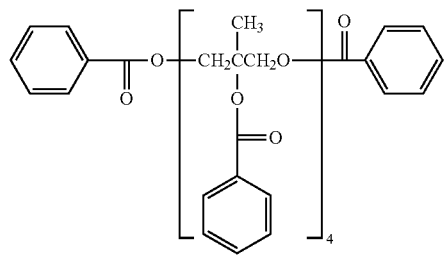
(22)
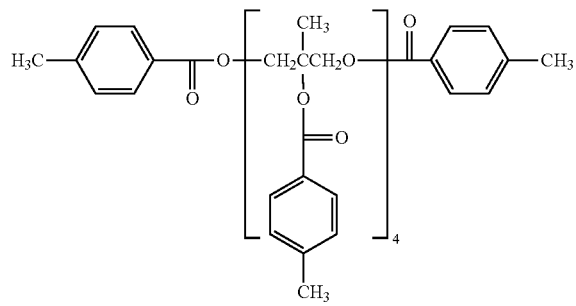

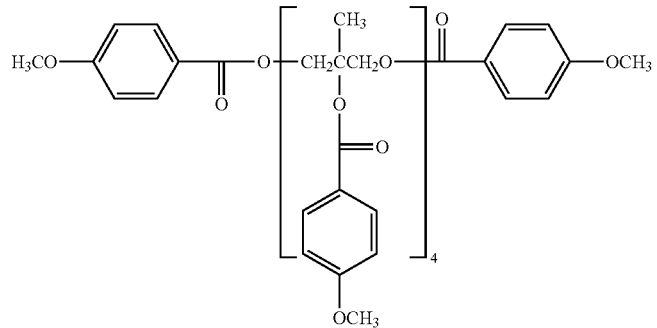
(23)
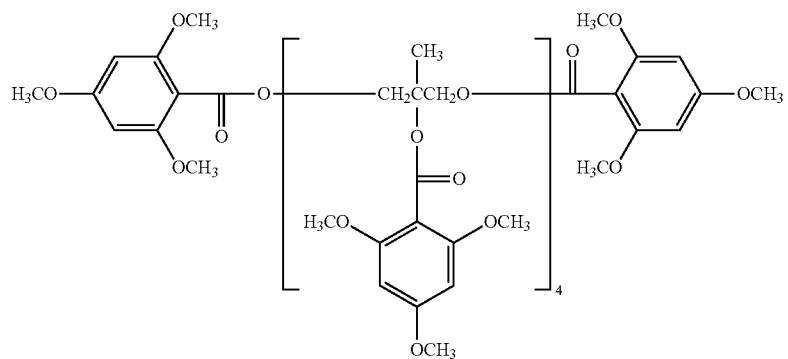
(24)
[Formula 16]
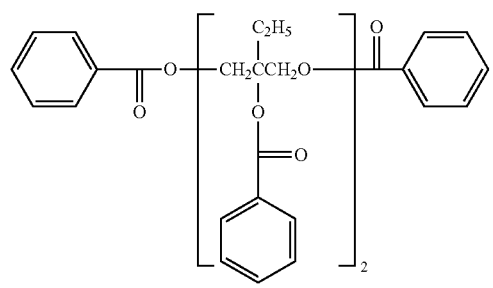
(25)
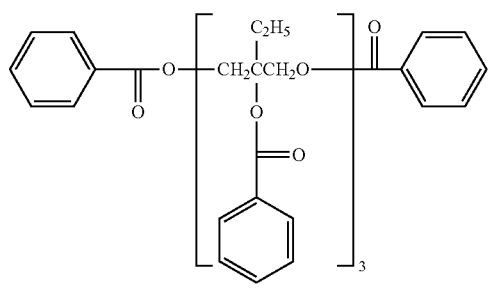
(26)
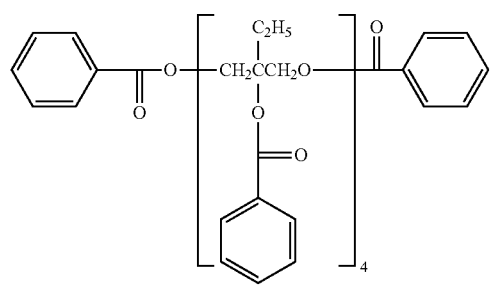
(27)

-continued
[Formula 17]
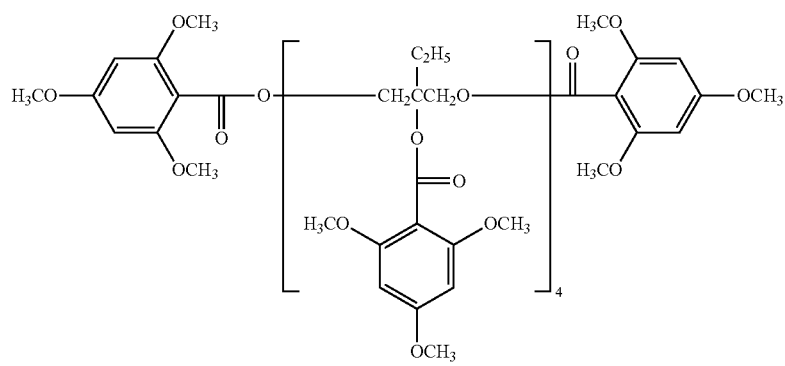
(28)
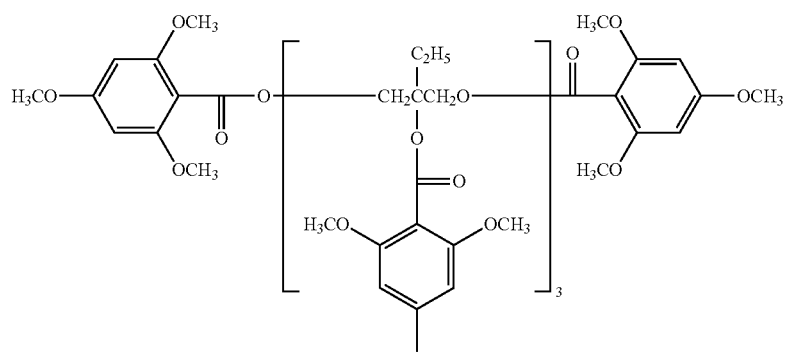
(29)
[Formula 18]
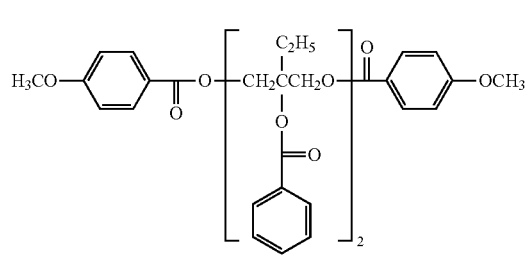
(30)
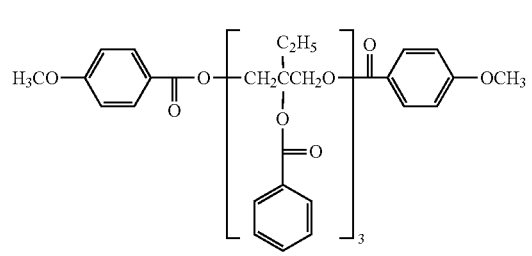
(31)
[Formula 19]
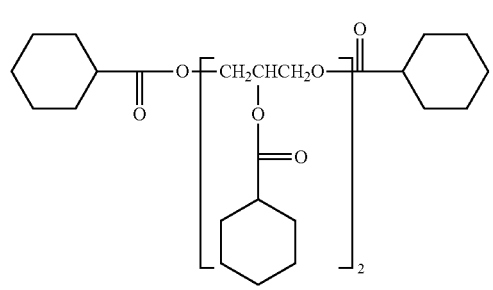
(32)
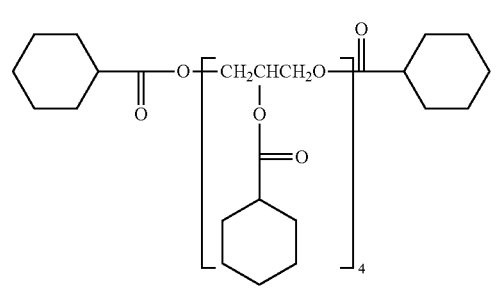
(33)
[Formula 20]
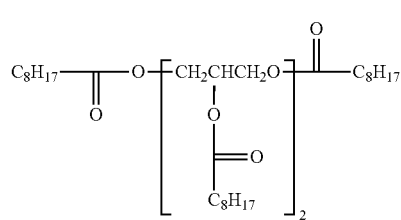
(34)
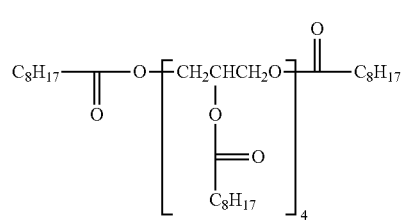
(35)

-continued
(36)
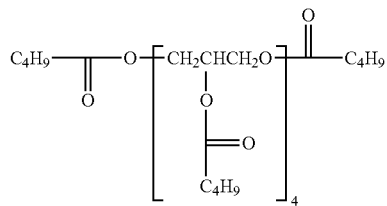
[Formula 21]
(37)
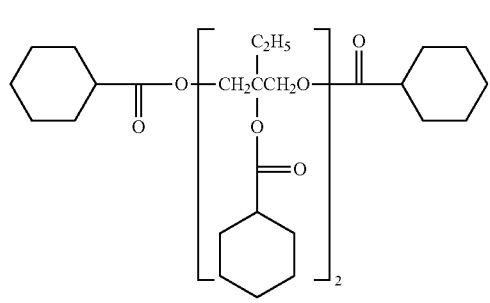
(38)
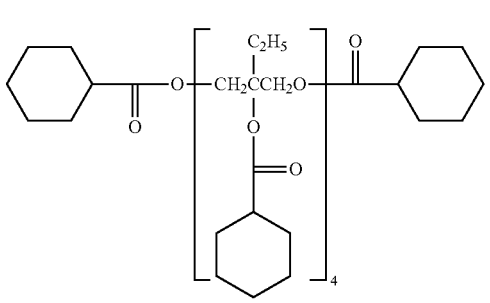
[Formula 22]
(39)
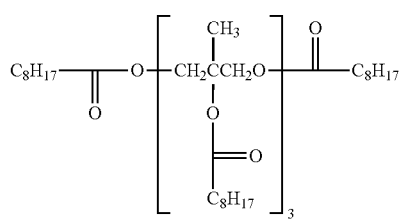
(40)
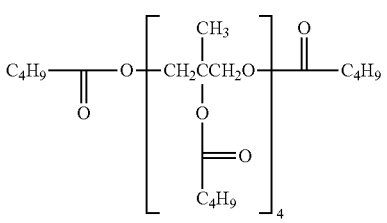
[Formula 23]
(41)
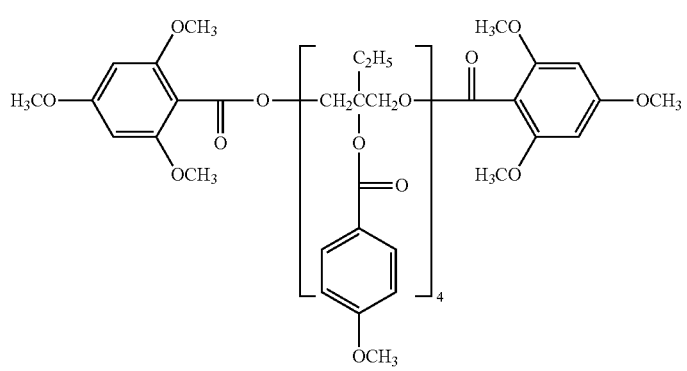
(42)
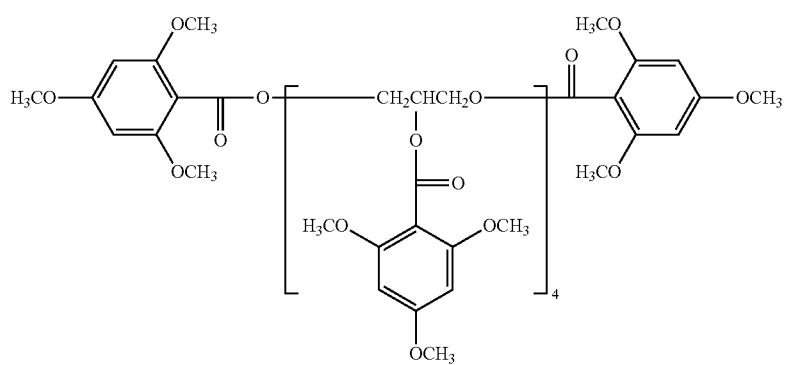

-continued
[Formula 24]
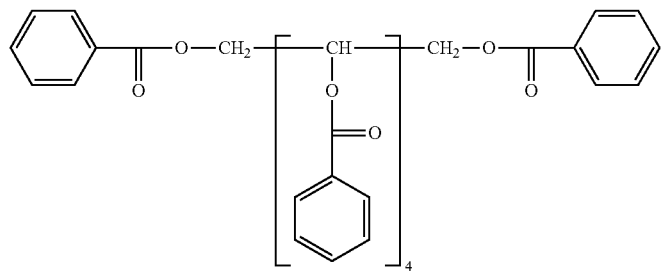
(43)
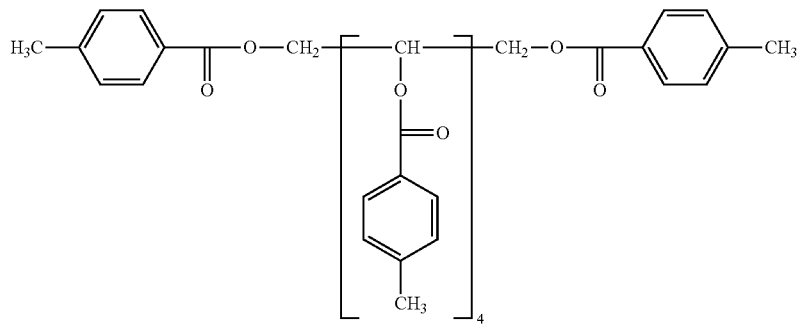
(44)
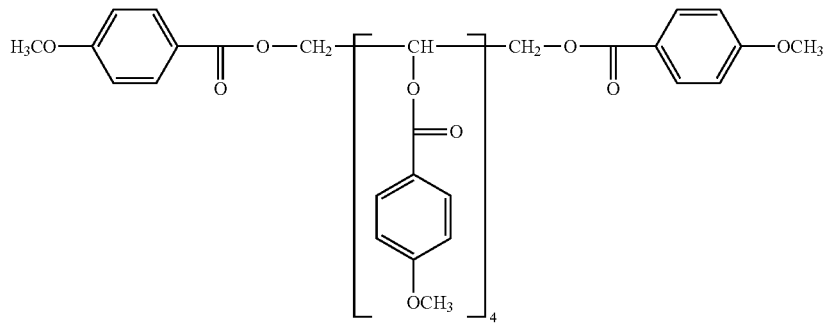
(45)
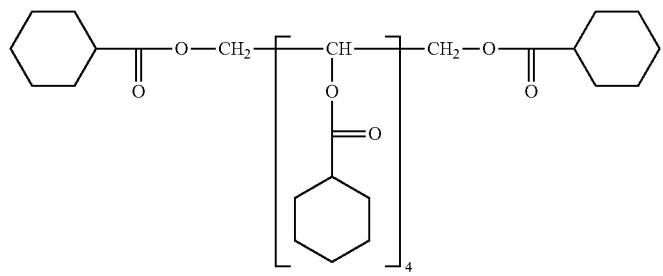
(46)
[Formula 25]
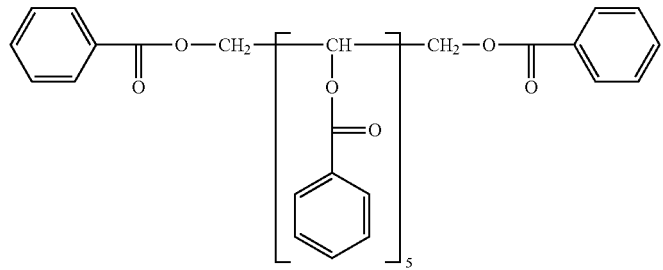
(47)

-continued
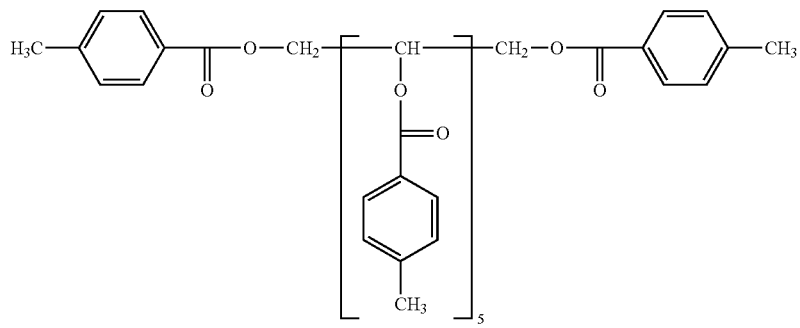
(48)
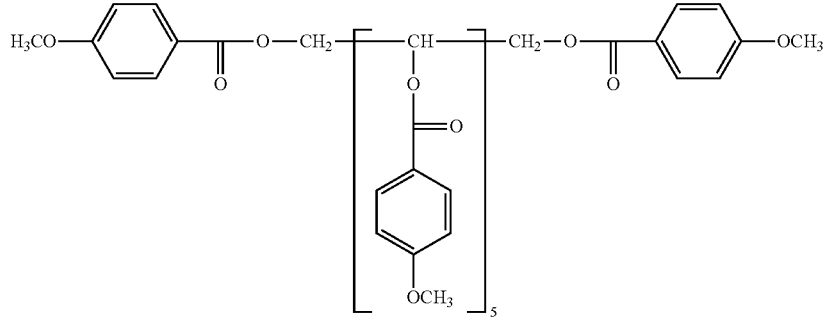
(49)
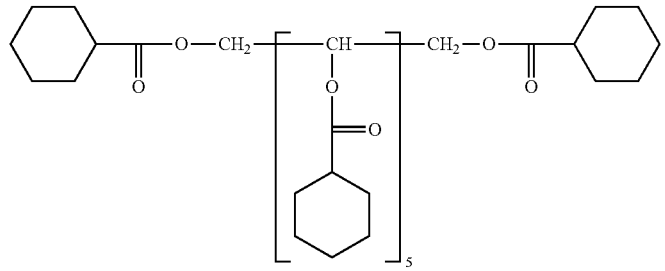
(50)
[Formula 26]
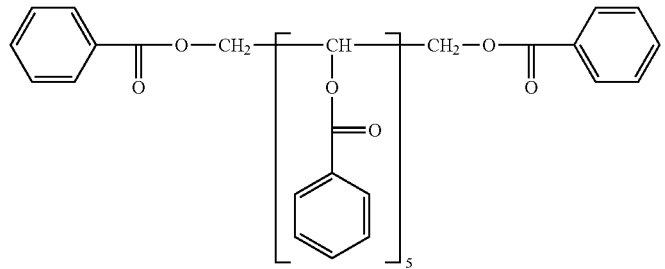
(51)
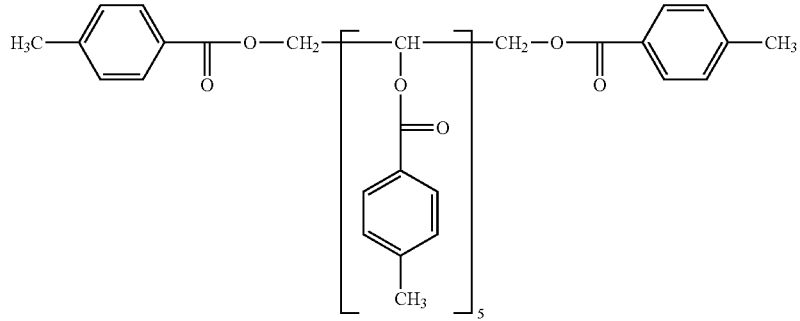
(52)

-continued
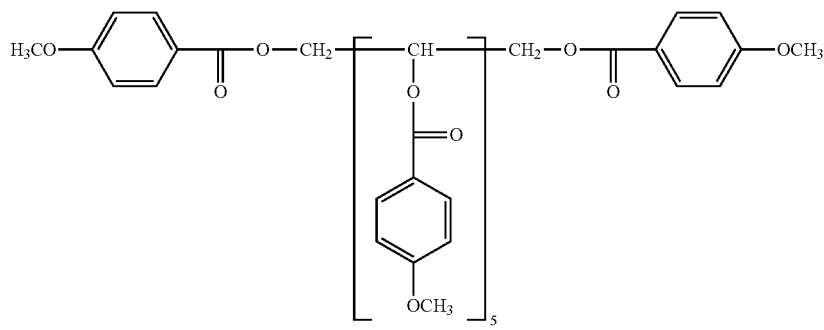
(53)
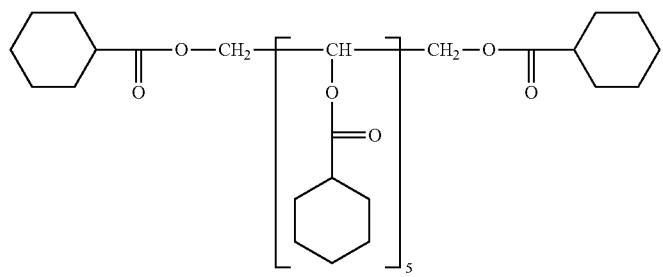
(54)
[Formula 27]
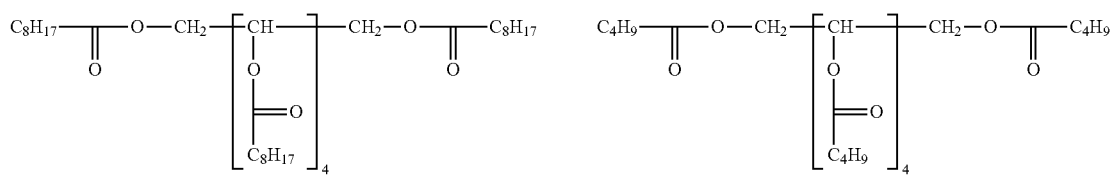
(55) (56)
[Formula 28]
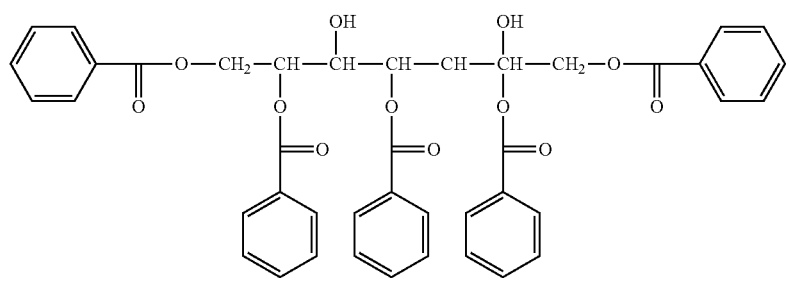
(57)
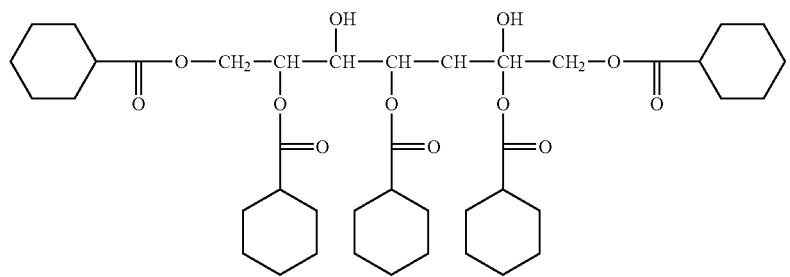
(58)

Other examples of the compound having a van der Waals volume of 500 Å$^3$ to 1,000 Å$^3$ are represented by the following general formula (V).

[Formula 29]

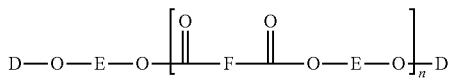

General Formula (V)

In general formula (V), D represents an aryl carboxylic acid residue, an alkyl carboxylic acid residue, or a hydrogen atom; E represents a $C_{2-12}$ alkylene glycol residue, a $C_{6-12}$ aryl glycol residue, or a $C_{4-12}$ oxyalkylene glycol residue; F represents a $C_{4-12}$ alkylene dicarboxylic acid residue or a $C_{6-12}$ aryl dicarboxylic acid residue; and n represents 2 to 4.

The compound represented by general formula (V) is generally obtained by copolymerizing a monomer having an aromatic ring. The monomer having an aromatic ring is at least one monomer selected from a $C_{8-20}$ aromatic dicarboxylic acid and a $C_{6-20}$ aromatic diol.

Examples of the $C_{8-20}$ aromatic dicarboxylic acid include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, and 2,6-naphthalenedicarboxylic acid. Among these, the aromatic dicarboxylic acid is preferably phthalic acid, terephthalic acid, and isophthalic acid.

Examples of the $C_{6-20}$ aromatic diol include, but are not particularly limited to, bisphenol A, 1,2-hydroxybenzene, 1,3-hydroxybenzene, 1,4-hydroxybenzene, and 1,4-benzene dimethanol. Bisphenol A, 1,4-hydroxybenzene, and 1,4-benzene dimethanol are preferable.

Specific examples of the compound represented by general formula (V) will be given below, but the compound is not limited thereto.

[Formula 30]

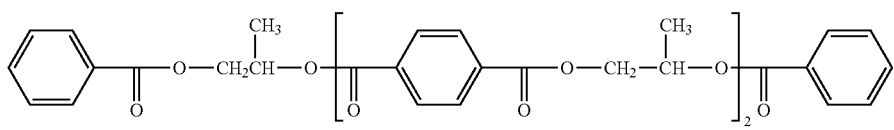

(59)

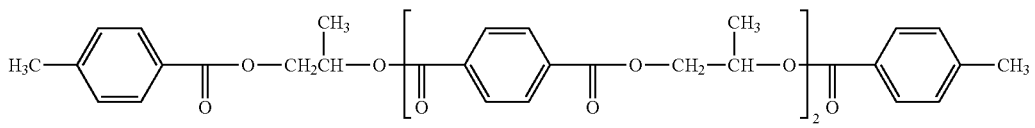

(60)

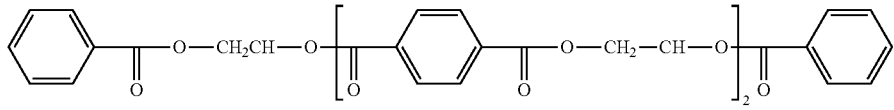

(61)

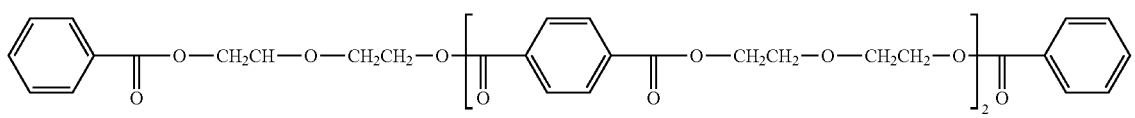

(62)

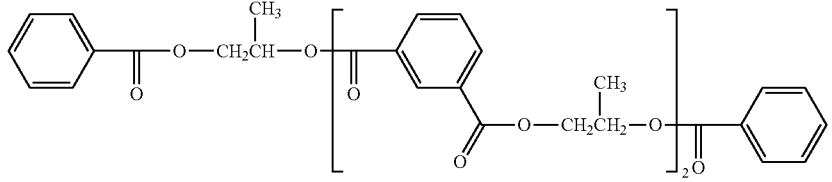

(63)

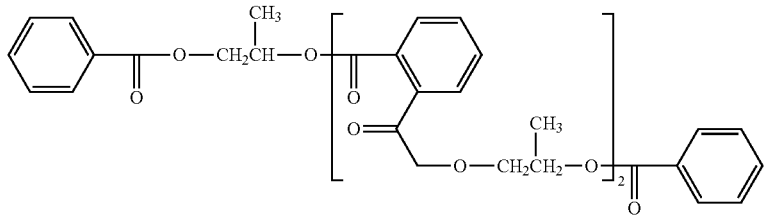

(64)

[Formula 31]
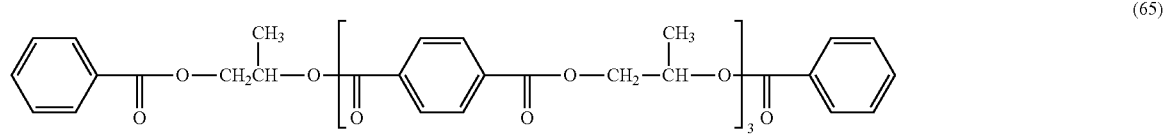
(65)
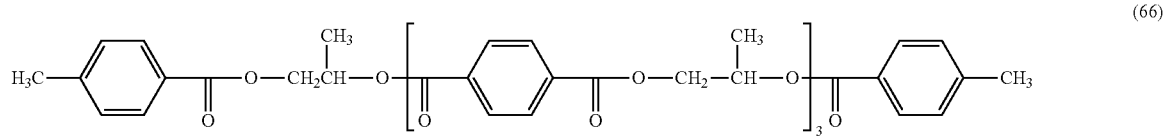
(66)
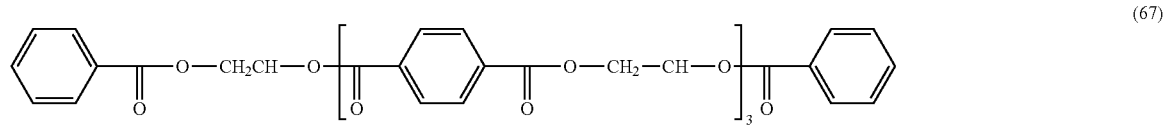
(67)
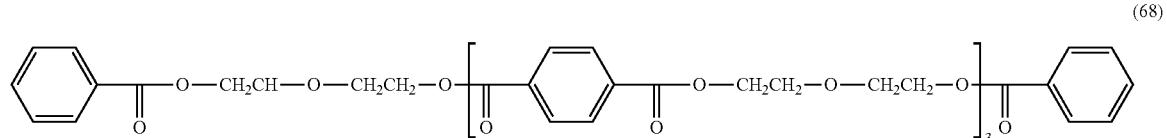
(68)
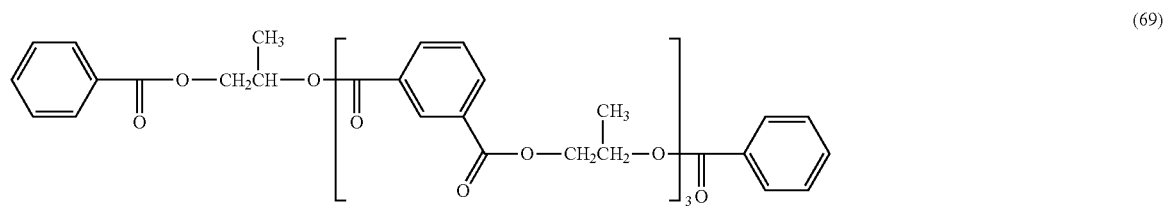
(69)
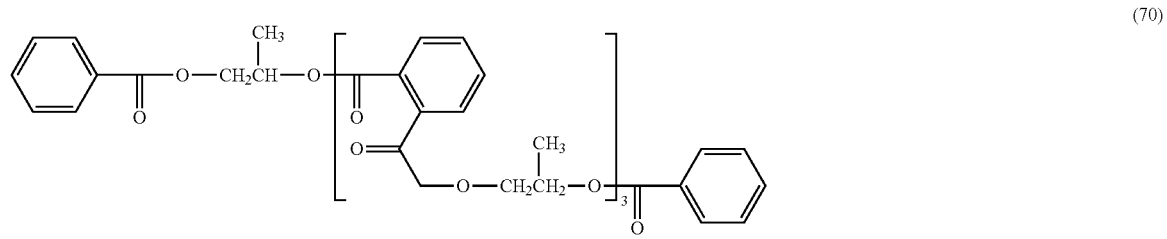
(70)
[Formula 32]
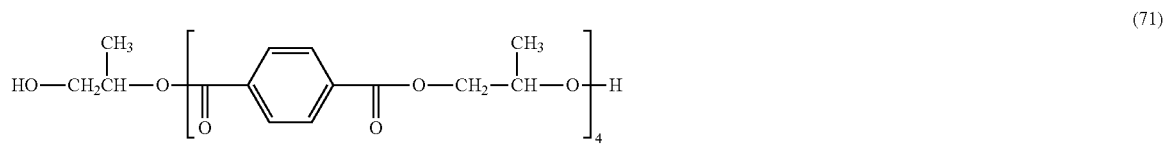
(71)
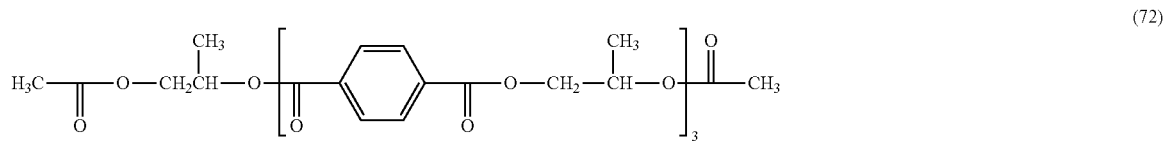
(72)
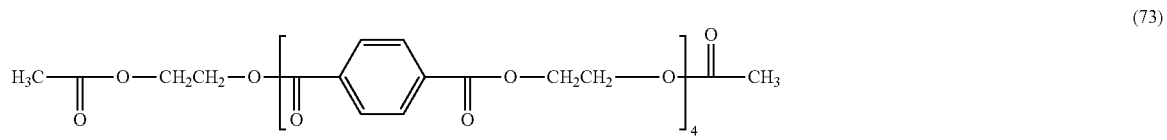
(73)
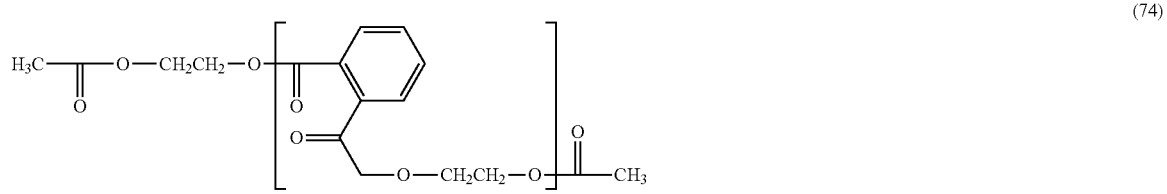
(74)

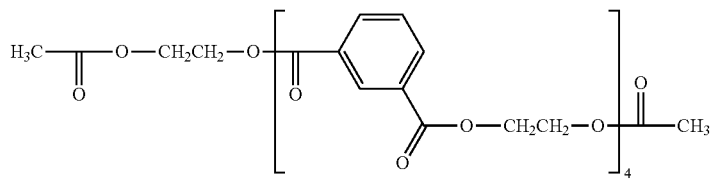

(75)

[Formula 33]

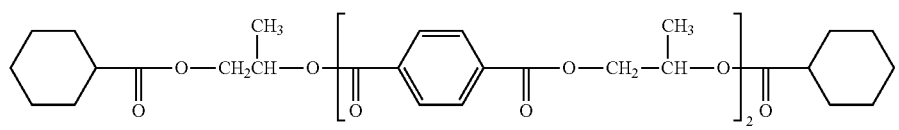

(76)

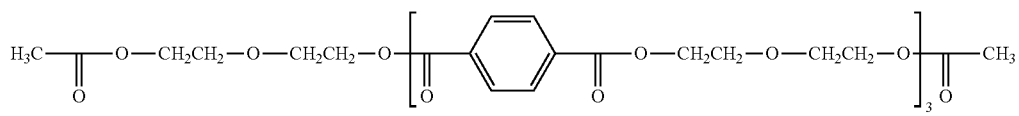

(77)

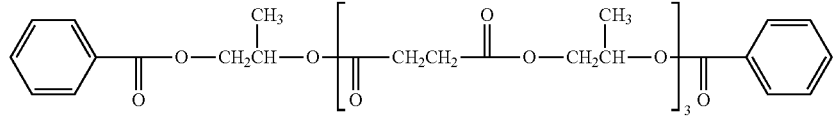

(78)

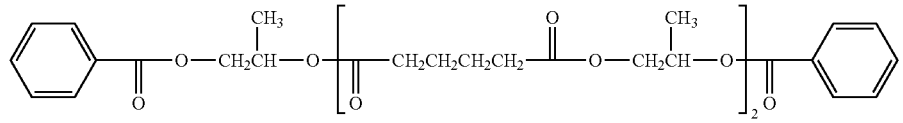

(79)

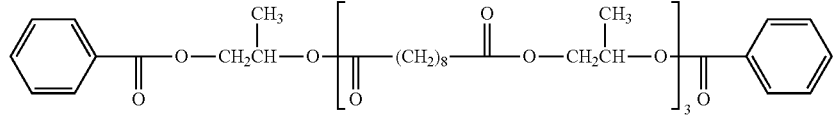

(80)

The retardation film of the present invention preferably contains one or a combination of two or more of compounds represented by general formulas (I) to (V) as the compound having a van der Waals volume of 500 Å$^3$ to 1,000 Å$^3$. The combination is not particularly limited, and several kinds of components may be combined. Among these, the retardation film of the present invention preferably contains the compound represented by general formula (I), (III), or (V). Particularly preferably, the compound having a van der Waals volume of 500 Å$^3$ to 1,000 Å$^3$ is terminally blocked by an alkyl group or an aromatic group.

The addition amount of the compound having a van der Waals volume of 500 Å$^3$ to 1,000 Å$^3$ is preferably 5 to 10 wt % relative to the cellulose acetate (the total of the cellulose acetate α and the cellulose acetate β). The hydrogen bonding action of the cellulose acetate can be sufficiently limited by setting the addition amount to 5 wt % or more. Bleed-out and a rise in haze, or the like can be limited by setting the addition amount to 10 wt % or less.

Plasticizers, antioxidants (antiaging agents), UV absorbents, release promoters, matting agents, lubricants, plasticizers and/or the like can be appropriately used for the retardation film of the present invention, if necessary.

(Plasticizer)

Examples of the plasticizer contained in the retardation film of the present invention include phthalates, phosphates, and polyhydric alcohol esters. The addition amount of the plasticizer is preferably 0.5 to 30 wt %, and particularly preferably 5 to 20 wt %, based on the cellulose ester.

The polyhydric alcohol esteric plasticizer is a plasticizer composed of an ester of a di- or more hydric aliphatic alcohol and a monocarboxylic acid, and preferably has an aromatic ring or a cycloalkyl ring in its molecule. The ester is preferably a di- to 20-hydric aliphatic alcohol ester.

The polyhydric alcohol constituting the polyhydric alcohol ester plasticizer is represented by the following general formula (a):

Ra-(OH)$_n$    General formula (a)

wherein Ra represents an n-valent organic group: n represents a positive integer of 2 or more; and the OH group represents an alcoholic or phenolic hydroxyl group.

Examples of the preferable polyhydric alcohol contained in the polyhydric alcohol ester plasticizer include, but are not particularly limited thereto, adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Particularly preferable are triethylene glycol, tetraethylene glycol, dipropylene glycol, tripropylene glycol, sorbitol, trimethylolpropane, and xylitol.

Monocarboxylic acids contained in the polyhydric alcohol ester plasticizer are not particularly limited, and known aliphatic monocarboxylic acids, alicyclic monocarboxylic acids, aromatic monocarboxylic acids and the like can be used. Use of the alicyclic monocarboxylic acids and aromatic monocarboxylic acids is preferable from the viewpoint of improving moisture permeability and retainability.

Examples of preferable monocarboxylic acids include, but not limited to, those described below.

Preferable aliphatic monocarboxylic acids are fatty acids having a $C_{1-32}$ straight chain or side chain. The number of carbon atoms is more preferably 1 to 20, and especially preferably 1 to 10. The addition of acetic acid is preferable because the compatibility with the cellulose derivative is enhanced, and mixing acetic acid and other monocarboxylic acids and using the mixture is also preferable.

Examples of preferable aliphatic monocarboxylic acids include saturated fatty acids such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids such as undecylenic acid, oleic acid, sorbic acid, linolic acid, linolenic acid and arachidonic acid.

Examples of preferable alicyclic monocarboxylic acids include cyclopentanecarboxylic acid, cyclohexanecarboxylic acid, cyclooctanecarboxylic acid, and derivatives thereof.

Examples of preferable aromatic monocarboxylic acids include benzoic acid, aromatic monocarboxylic acids in which one to three alkyl groups or alkoxy groups such as a methoxy group and an ethoxy group are incorporated to a benzene ring of benzoic acid such as toluic acid, and aromatic monocarboxylic acids having two or more benzene rings such as biphenylcarboxylic acid, naphthalenecarboxylic acid and tetralincarboxylic acid, and derivatives thereof. Benzoic acid is particularly preferable.

One or a combination of carboxylic acids may constitute the esters of the polyhydric alcohol ester plasticizers. All of the OH groups in the polyhydric alcohol may be esterified or some of the OH groups may remain intact.

The molecular weight of the polyhydric alcohol ester plasticizers is not particularly limited, but is preferably 300 to 1,500, and more preferably 350 to 750. A higher molecular weight is preferable since the polyhydric alcohol ester plasticizers hardly volatilize. A lower molecular weight is preferable from the viewpoint of the moisture permeability and the compatibility with the cellulose ester.

Examples of the phthalate ester plasticizers include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

Examples of the phosphate ester plasticizers include triphenyl phosphate, tricresyl phosphate, cresyl diphenyl phosphate, octyl diphenyl phosphate, diphenyl biphenyl phosphate, trioctyl phosphate, and tributyl phosphate.

(Antiaging Agent)

The retardation film of the present invention may contain a known antiaging agent (antioxidant). Examples of the antiaging agent (antioxidant) include phenol or hydroquinone antioxidants such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, and pentaerythrityl-tetrakis[3-(3,5-di-tert-butyl-4-hydroxyphenyl)propionate].

Further, the retardation film preferably contains phosphorus antioxidants such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl) pentaerythritol diphosphite, and bis(2,4-di-tert-butylphenyl) pentaerythritol diphosphite.

The addition amount of the antiaging agent is 0.05 to 5.0 parts by weight relative to 100 parts by weight of a cellulose resin.

(UV Absorbent)

The retardation film of the present invention preferably contains a UV absorbent from the viewpoint of preventing the deterioration of the polarizing plate, liquid crystal or the like. The UV absorbent preferably has an excellent UV-absorbing capability at a wavelength of 370 nm or less, and has little absorption of visible light having a wavelength of 400 nm or more, from the viewpoint of good liquid crystal display capability.

Specific examples of preferable UV absorbent include hindered phenol compounds, hydroxybenzophenone compounds, benzotriazole compounds, salicylate ester compounds, benzophenone compounds, cyanoacrylate compounds, and nickel complex salt compounds.

Examples of the hindered phenol compounds include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl) benzene, and tris-(3,5-di-tert-butyl-4-hydroxybenzyl)-isocyanurate.

Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl)propionate].

The addition amount of the UV absorber is preferably 1 ppm to 1.0%, and more preferably 10 to 1,000 ppm in terms of the ratio by weight thereof in the entire retardation film.

(Release Promoter)

The retardation film of the present invention preferably contains a release promoter from the viewpoint of improving the releasability thereof. The content of the release promoter is, for example, 0.001 to 1 wt %, preferably 0.005 to 0.5 wt %, and more preferably 0.01 to 0.3 wt %. Preferably, the content is 1 wt % or less since the release promoter hardly separates from the film. Preferably, the content is 0.005 wt % or more since a desired release reduction effect can be obtained.

Any of the release promoters known in the art can be employed; organic or inorganic acidic compounds, surfactants, chelating agents and the like can be used. Above all, polycarboxylic acids and esters thereof are effective. Particularly, ethyl esters of citric acid can be effectively used.

(Matting Agent)

Fine particles may be added to the retardation film of the present invention in order to prevent the film from being scratched while it is handled and prevent the transferability of the film from worsening. These are referred to as a matting agent, an antiblocking agent, or an anti-creaking agent, and are heretofore utilized. The material of the fine particles is not particularly limited as long as the material exhibits the above-mentioned function. It may be a matting agent of an inorganic compound or a matting agent of an organic compound.

Examples of preferable matting agent of the inorganic compound include silicon-containing inorganic compounds (for example, silicon dioxide, calcined calcium silicate, hydrated calcium silicate, aluminium silicate, and magnesium silicate or the like), titanium oxide, zinc oxide, aluminium oxide, barium oxide, zirconium oxide, strontium oxide, antimony oxide, tin oxide, tin-antimony oxide, calcium carbonate, talc, clay, calcined kaolin, and calcium phosphate.

Examples of more preferable matting agent of the inorganic compound include silicon-containing inorganic compounds and zirconium oxide. Silicon dioxide is particularly preferable since it can reduce the haze of cellulose acylate films. As the fine particles of silicon dioxide, for example, commercial products can be used, which have trade names such as Aerosil R972, R974, R812, 200, 300, R202, OX50, and TT600 (which are all manufactured by Nippon Aerosil Co., Ltd.). As the fine particles of zirconium oxide, for example, commercial products can be used, which have trade names such as Aerosil R976 and R811 (all manufactured by Nippon Aerosil Co., Ltd.).

Specific examples of preferable matting agent of the organic compound include polymers such as silicone resins, fluororesins, and acrylic resins. Above all, silicone resins are preferable. Further, among the silicone resins, those having a three-dimensional network structure are particularly preferable. For example, commercial products can be used, which have trade names such as Tospearl 103, Tospearl 105, Tospearl 108, Tospearl 120, Tospearl 145, Tospearl 3120, and Tospearl 240 (all manufactured by Toshiba Silicone Co. Ltd.).

The content of the matting agent in the retardation film of the present invention is preferably 0.01 to 5.0 wt %, more preferably 0.03 to 3.0 wt %, and particularly preferably 0.05 to 1.0 wt %.

(Retardation)

The retardation (in-plane retardation Re and retardation in the thickness direction Rth) of the retardation film of the present invention is appropriately selected depending on the design of a liquid crystal cell and optical film. In general, it is preferable that the in-plane retardation Re is 25 nm≤|Re|≤75 nm; and the retardation in the thickness direction Rth is 50 nm≤|Rth|≤250 nm. More preferably, 40 nm≤|Re|≤75 nm, and particularly preferably 45 nm≤|Re|≤70 nm. More preferably, 70 nm≤|Rth|≤240 nm, and particularly preferably 90 nm≤|Rth|≤230 nm.

The in-plane retardation Re ($\lambda$) and the retardation in the thickness direction Rth ($\lambda$) represent the retardation in the plane and the retardation in the thickness direction, respectively, at a wavelength of $\lambda$. Unless otherwise noted, the wavelength of $\lambda$ is 590 nm.

The in-plane retardation Re ($\lambda$) is measured with KOBRA 21ADH (manufactured by Oji Scientific Instruments) while allowing light having a wavelength of $\lambda$ nm to enter in the normal direction of the film.

With the in-plane slow axis (determined by KOBRA 21ADH) taken as the inclination axis (rotation axis) of the film (when the film has no slow axis, the rotation axis of the film is in any in-plane direction of the film), the in-plane retardation Re ($\lambda$) is measured at 6 points, up to 50 degrees relative to the normal direction of the film at intervals of 10 degrees, by applying light having a wavelength of $\lambda$ nm from the respective inclined directions of the film. KOBRA 21ADH calculates the retardation in the thickness direction Rth ($\lambda$) based on the measured retardation values, the estimated average refractive index, and the input thickness value.

With the slow axis taken as the inclination axis (rotation axis) (when the film has no slow axis, the rotation axis of the film is in any in-plane direction of the film), the retardation values of the film are measured in any two directions. The retardation in the thickness direction Rth may be calculated according to the following formulas (A) and (B) based on the values, the estimated average refractive index, and the input thickness value.

[Expression 1]

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Formula (A)}$$

[Expression 2]

$$Rth=((nx+ny)/2-nz)\times d \quad \text{Formula (B)}$$

Re($\theta$) represents the retardation value in the direction inclined in the degree of angle ($\theta$) to the normal direction. d represents a film thickness. In this case, the average refractive index n is needed as a parameter. This is measured with an Abbe's refractometer ("Abbe refractometer 2-T" manufactured by ATAGO CO., LTD.).

As the estimated average refractive index, values described in a polymer handbook (JOHN WILEY & SONS, INC.) and catalogues of various optical films can be used. For films in which the average refractive index is unknown, the average refractive index can be measured by using an Abbe refractometer. Values of the average refractive index of main optical films are exemplified below: cellulose acylate (1.48), cycloolefin polymer (1.52), polycarbonate (1.59), polymethylmethacrylate (1.49), and polystyrene (1.59).

The nx, the ny, and the nz are calculated by inputting the assumed values of the average refractive index and the film thickness into KOBRA 21ADH. On the basis of the thus calculated nx, ny and nz, Nz=(nx−nz)/(nx−ny) is further calculated.

(NZ Factor)

In the retardation film of the present invention, an NZ factor represented by the following formula (7) is preferably 7 or less, more preferably 5.5 or less, and particularly preferably 4.5 or less. In general, however, the Nz factor is appropriately determined depending on the design of the liquid crystal cell and optical film or the like.

[Expression 3]

$$Nz \text{ factor}=Rth/Re+0.5 \quad \text{Formula (7)}$$

(Haze)

The retardation film of the present invention preferably has a haze of less than 1%, and more preferably less than 0.5%. When the retardation film has a haze of less than 1%, the transparency of the film advantageously increases so that the film is more easily used as an optical film.

(Average Water Content)

The retardation film of the present invention preferably has an equilibrium water content of 4% or less (25° C. and 60% relative humidity), and more preferably 3% or less. When the retardation film has an average water content of 4% or less, the film readily follows the humidity change and is therefore preferable since the optical characteristics and the dimension thereof change little.

(Film Thickness)

The average film thickness of the retardation film of the present invention is preferably 30 to 100 µm, more preferably 30 to 80 µm, and still more preferably 30 to 70 µm. When the retardation film has an average film thickness of 30 µm or more, the handlability of the film is preferably improved in producing the film as a web. When the retardation film has an average film thickness of 100 µm or less, the film readily follows the humidity change and readily keeps the optical characteristics.

(Film Width)

The width of the retardation film of the present invention is preferably 700 to 3,000 mm, more preferably 1,000 to 2,800 mm, and particularly preferably 1,500 to 2,500 mm.

It is preferable that the film of the present invention has a width of 700 to 3,000 mm and ΔRe of 10 nm or less.

[Method for Manufacturing Retardation Film]

A method for manufacturing a retardation film of the present invention (hereinafter, also referred to as a manufacturing method of the present invention) includes casting on a support a dope containing cellulose acetate satisfying the degree of substitution and a compound satisfying the van der Waals volume, drying the cast dope and peeling it from the support, and stretching the peeled film. In detail, the retardation film of the present invention is manufactured by film-forming a solution (dope) in which cellulose acetate is dissolved in an organic solvent according to a solvent casting method.

(Preparation of Dope)

The organic solvent of the dope may be used singly or as a mixed solvent of two or more organic solvents.

The organic solvent of the dope preferably contains a solvent selected from $C_{3-12}$ ethers, $C_{3-12}$ ketones, $C_{3-12}$ esters, and $C_{1-6}$ halogenated hydrocarbons. The ethers, the ketones and the esters may have a cyclic structure. Compounds having two or more functional groups of ethers, ketones and esters (i.e., —O—, —CO—, and —COO—) can also be used as the organic solvent.

Examples of the $C_{3-12}$ ethers include diisopropyl ether, dimethoxymethane, dimethoxyethane, 1,4-dioxane, 1,3-dioxolane, tetrahydrofuran, anisole, and phenetole. Examples of the $C_{3-12}$ ketones include acetone, methyl ethyl ketone, diethyl ketone, diisobutyl ketone, cyclohexanone, and methylcyclohexanone. Examples of the $C_{3-12}$ esters include ethyl formate, propyl formate, pentyl formate, methyl acetate, ethyl acetate, and pentyl acetate.

The organic solvent of the dope may have any other functional group such as an alcoholic hydroxyl group. In the case of an organic solvent having two or more kinds of functional groups, the number of carbon atoms may fall within a defined range of a compound having any one of the functional groups. Examples of the organic solvent having two or more kinds of functional groups include 2-ethoxyethyl acetate, 2-methoxyethanol, and 2-butoxyethanol.

The number of the carbon atoms in the halogenated hydrocarbon is preferably 1 or 2, and most preferably 1. The halogen in the halogenated hydrocarbon is preferably chlorine. The proportion of hydrogen atoms substituted with a halogen in the halogenated hydrocarbon is preferably 25 to 75 mol %, more preferably 30 to 70 mol %, still more preferably 35 to 65 mol %, and most preferably 40 to 60 mol %. Methylene chloride is a typical halogenated hydrocarbon.

The dope may be prepared according to a common method. The common method means a treatment at a temperature of 0° C. or more (normal temperature or high temperatures). The dope can be prepared by using a method and an apparatus for dope preparation according to a common solvent casting method. In the common method, a halogenated hydrocarbon (particularly methylene chloride) is preferably used as the organic solvent.

The content of the cellulose acetate in the dope is preferably adjusted to 10 wt % to 40 wt %, and more preferably 10 wt % to 30 wt %. Any additives to be mentioned below may be added to the organic solvent (main solvent).

The dope can be prepared by stirring the cellulose acetate, the other component, and the organic solvent at normal temperature (0° C. to 40° C.). The high-concentration solution may be stirred under pressure and heating conditions. Specifically, the cellulose acetate, the other component, and the organic solvent are put in a pressure vessel, and hermetically sealed, and followed by stirring under pressure while heating at a temperature of the boiling point or more of the solvent at normal temperature within a range where the solvent is not boiled. The heating temperature is usually 40° C. or more, preferably 60° C. to 200° C., and more preferably 80° C. to 110° C.

The cellulose acetate and the other component may be coarsely mixed in advance, and the obtained mixture may be then charged into the vessel. The cellulose acetate and the other component may be successively charged into the vessel. The vessel can be pressurized by injecting an inert gas such as nitrogen gas. A rise in the vapor pressure of the solvent due to heating may be utilized. Alternatively, each component may be added under pressure after hermetically sealing the vessel.

In order to heat the dope, heating is preferably carried out from the outside of the vessel. For example, a jacket type heating device can be used. The whole vessel can be heated by installing a plate heater in the outside of the vessel and laying a pipe to circulate a liquid therein.

The vessel needs to be constituted such that the contents in the vessel can be stirred. For example, a stirring blade is preferably provided in the vessel to stir the contents using the stirring blade. The stirring blade has preferably a length so as to reach the vicinity of a wall of the vessel. A scraping blade is preferably provided at the terminal of the stirring blade in order to renew a liquid film of the wall of the vessel.

Meters such as a pressure gauge and a thermometer may be installed in the vessel. In the vessel, each component is dissolved in a solvent. The prepared dope is cooled and then taken out from the vessel, or taken out from the vessel and then cooled by using a heat exchanger or the like.

The dope may also be prepared according to a cooling dissolution method. According to the cooling dissolution method, the cellulose acetate can be dissolved even in an organic solvent in which it can be hardly dissolved with a common dissolution method. Even in the solvent in which the cellulose acetate can be dissolved with the common dissolution method, the cooling dissolution method is advantageous in that a uniform solution can be rapidly prepared.

In the cooling dissolution method, first, the cellulose acetate is gradually added to an organic solvent at room temperature while stirring. The amount of the cellulose acetate in the mixture to be obtained is preferably adjusted to 10 to 40 wt %. The amount of the cellulose acetate is more preferably 10 to 30 wt %. Further, any additives to be mentioned below may be added to the mixture.

Next, the obtained mixture is cooled to −100° C. to −10° C. (preferably −80° C. to −10° C., more preferably −50° C. to −20° C., and most preferably −50° C. to −30° C.). The cooling may be attained, for example, in a dry ice/methanol bath (−75° C.) or in a cooled diethylene glycol solution (−30° C. to −20° C.). When the mixture is cooled, the mixture of the cellulose acetate and organic solvent is solidified.

At this time, the cooling speed is preferably 4° C./min or more, more preferably 8° C./min or more, and most preferably 12° C./min or more. The higher cooling speed is more preferable. However, the theoretical uppermost limit is 10,000° C./sec; the technical uppermost limit is 1,000° C./sec; and the practicable uppermost limit is 100° C./sec. The cooling speed is a value obtained by dividing the difference between the temperature at the start of the cooling and the final cooling temperature by the time taken from the start of the cooling to the arrival to the final cooling temperature.

Then, when the cooled mixture is heated at 0° C. to 200° C. (preferably 0° C. to 150° C., and more preferably 0° C. to 120° C., and most preferably 0° C. to 50° C.), the cellulose acetate is dissolved in the organic solvent. For the heating, the mixture may be left at room temperature, or may be heated in a hot bath. The heating speed is preferably 4° C./min or more, more preferably 8° C./min or more, and most preferably 12° C./min or more. The higher heating speed is more preferable. However, the theoretical uppermost limit is 10,000° C./sec; the technical uppermost limit is 1,000° C./sec; and the practicable uppermost limit is 100° C./sec. The heating speed is a value obtained by dividing the difference between the temperature at the start of the heating and the final heating temperature by the time taken from the start of the heating to the arrival to the final heating temperature.

As in the above, a uniform solution, that is, a dope is obtained. When the dissolution of a solute is insufficient, the cooling and heating operations may be repeated. Whether or not the dissolution is sufficient may be determined merely by visually observing the outward appearance of the solution.

In the cooling dissolution method, in order to prevent the mixture from being contaminated with water from the dew formed in cooling, a sealed vessel is preferably used. In the cooling and heating operations, the vessel is made under pressure in cooling and is made under reduced pressure in heating, and thereby the dissolution time can be shortened. For pressurizing and depressurizing the vessel, a pressure resistant vessel is desirably used.

A 20 wt % solution prepared by dissolving the cellulose acetate (degree of total acetyl substitution: 60.9%, viscosity-average degree of polymerization: 299) in methyl acetate according to the cooling dissolution method has a pseudo-phase transition point between a sol state and a gel state at about 33° C. when the solution is analyzed through differential scanning calorimetry (DSC). At a temperature equal to or less than the pseudo-phase transition point, the solution becomes in a uniform gel state. Accordingly, the solution needs to be stored at the pseudo-phase transition temperature or higher, and preferably at around a temperature of the gel-phase transition temperature plus 10° C. However, the pseudo-phase transition temperature differs depending on the degree of total acetyl substitution and the viscosity-average degree of polymerization of the cellulose acetate, and on the solution concentration and the organic solvent to be used.

The method for blending the additive with the dope is not particularly limited. Any method may be used as long as the method can provide a desired dope. For example, the additive may be blended in the stage where cellulose acetate is mixed with a solvent; or the additive may be added to a mixture solution produced from cellulose acetate and a solvent. Further, the additive may be blended with a dope immediately before the dope is cast.

A technique of blending the additive immediately before casting the dope is also referred to as in-line addition. The in-line addition is performed in a screw type kneader which is on-line installed. Specifically, the in-line addition is performed in a static mixer such as an in-line mixer. Examples of preferable in-line mixer include a static mixer SWJ (Toray's static tubular mixer, Hi-Mixer, manufactured by Toray Engineering Co., Ltd.).

The in-line addition is described in, for example, Japanese Patent Application Laid-Open No. 2003-053752. Japanese Patent Application Laid-Open No. 2003-053752 discloses that the distance L between an addition nozzle tip for mixing an additive liquid having a composition different from that of the main material dope and the start end of an in-line mixer is controlled to 5 times or less the inner diameter d of the main material feeding line, and thereby unevenness in image density and aggregation of matting particles or the like can be prevented. Japanese Patent Application Laid-Open No. 2003-053752 describes a more preferable embodiment, in which the distance (L) between a feeding nozzle tip opening for an additive liquid having a composition different from that of the main material dope and the start end of the in-line mixer is controlled to 10 times or less the inner diameter (d) of the feeding nozzle tip opening. Japanese Patent Application Laid-Open No. 2003-053752 describes a static non-stirring tubular mixer or a dynamic stirring tubular mixer as the in-line mixer.

Further, Japanese Patent Application Laid-Open No. 2003-053752 discloses that the flow ratio of the cellulose acylate film main material dope/in-line additive liquid is 10/1 to 500/1, and preferably 50/1 to 200/1.

Japanese Patent Application Laid-Open No. 2003-014933 discloses, as the method for adding additives to a dope, a technique of adding the additive to a dissolution tank, and a technique of adding the additive or a solution or dispersion of the additive to the dope to be fed from the dissolving tank to a casting die. Japanese Patent Application Laid-Open No. 2003-014933 discloses that, in the latter case, mixing means such as a static mixer is preferably provided in order to enhance the mixing efficiency.

(Casting)

The dope is cast on a drum or a band, and the solvent is vaporized to form a film. The dope to be cast is preferably adjusted so as to have a concentration of 18 to 35 wt % in terms of solids content. The surface of the drum or band is preferably mirror-finished. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patent Nos. 640,731 and 736,892, Japanese Patent Publication Nos. 45-4554 and 49-5614, and Japanese Patent Application Laid-Open Nos. 60-176834, 60-203430 and 62-115035.

The dope is preferably cast on a drum or a band at a surface temperature of 10° C. or less. After casting, the dope is preferably dried by exposing the dope to the wind for 2 seconds or more. The obtained film is peeled away from the drum or the band. Further, the film may be dried with the high-temperature wind of which the temperature is stepwise changed from 100° C. to 160° C., to vaporize the residual solvent. The method is described in Japanese Patent Publication No. 05-17844. According to the method, the time to be taken from the casting to the peeling can be shortened. In order to carry out the method, the dope needs to be gelled at the surface temperature of the drum or band on which it is cast.

In the manufacturing method of the film of the present invention, it is important to reduce the variation in the residual solvent amount. In order to reduce the variation in the residual solvent amount, it is necessary to sufficiently volatilize the solvent by the time immediately before the stretching from the casting. Specifically, the film is peeled away from the drum or the band, and then dried with the high-temperature wind before the stretching. The temperature of the high-temperature wind is preferably 120° C. to 180° C. and more preferably 140° C. to 170° C.

Other functional material liquids may be cast simultaneously with the casting of the dope, to simultaneously form other functional layers (for example, an adhesive layer, a dye layer, an antistatic layer, an anti-halation layer, a UV absorbing layer, a polarizing layer or the like).

(Drying)

The dope cast on the drum or the band is dried, and then peeled away from the drum or the band. The peeled product is referred to as a web. The web, which is peeled off at a peeling position immediately before the drum or the belt goes on a round, is conveyed by a conveying method which allows the web to pass alternately through a group of rolls disposed in a zig-zag pattern, or by a conveying method which allows the peeled web to be nipped by means of a clip or the like at both edges thereof and is conveyed in a non-contact way.

Drying is carried out by a method which blows both sides of the web (film) while being conveyed at a predetermined temperature, or by a method which uses heating means such as a microwave oven. Rapid drying may damage the planarity of a film to be formed. Therefore, it is preferable that the film is dried at a temperature where bubbles are not produced from the solvent at the early stage of drying; drying is progressed; and the film is then dried at a high temperature.

In the drying process after peeling-off from the support, the film is apt to shrink in a longitudinal or width direction by evaporation of the solvent. The shrinkage increases as drying is performed at higher temperatures. In order to improve the planarity of the film to be obtained, the film is preferably dried while the shrinkage is limited as much as possible. In this regard, as described, for example, in Japanese Patent Application Laid-Open No. 62-46625, the whole or part of the drying process is preferably performed while the both edges of the width of the web are maintained by means of a clip or pin in a width direction (tenter type).

In the drying process, the drying temperature is preferably 100 to 145° C. The drying temperature, the drying air flow, and the drying time vary depending on the solvent to be used, but may be appropriately selected according to the kind and combination of solvents to be used.

(Stretching)

The manufacturing method of the present invention includes drying the single layer- or multilayer-cast dope, peeling it from the support, and stretching the peeled web. The web peeled from the support is preferably stretched when the residual solvent amount in the web is less than 120 wt %.

The residual solvent amount in the web is represented by the following formula:

[Expression 4]

Residual Solvent Amount (wt %)={(M–N)/N}×100 where M is the weight of the web at a point of time, and N is the mass of the web having the measured weight M when the web is dried at 110° C. for 3 hours.

When the residual solvent amount in the web is excessively high, it is impossible to obtain stretching effects. When the amount is excessively low, it becomes significantly difficult to perform stretching, and the web may break. The residual solvent amount in the web is more preferably 5 wt % to 50 wt % and still more preferably 8 wt % to 35 wt %. When the stretching magnification is excessively low, it is impossible to obtain sufficient retardation. When the stretching magnification is excessively high, it becomes significantly difficult to perform stretching, and the web may break. Further, since the retardation value of the stretched film does not readily change even if the residual solvent amount in the web varies within a range of 8 to 10 wt %, the residual solvent amount in the web is preferably adjusted to 8 to 10 wt %.

When the residual solvent amount is different between webs, even if the webs are stretched under the same conditions other than the residual solvent amount, the optical characteristics (typically, retardation) of the resultant stretched films are different. However, in the manufacturing process, it is difficult to control the residual solvent amount in the web precisely. Accordingly, a limited variation in the optical characteristics of the stretched film even if the residual solvent amount in the web changes is extremely advantageous in terms of manufacturing. Since the retardation film of the present invention contains the cellulose ester and the compound having a van der Waals volume of 500 Å$^3$ to 1,000 Å$^3$, the optical characteristics (retardation) of the stretched film is less likely to vary even if the residual solvent amount in the web changes.

Specifically, when the residual solvent amount of the web at the start of stretching is increased by X (%), and the decrease amount of Re of the retardation film to be obtained is defined as Y (nm), Y/X is preferably 1 nm/% to 3 nm/%.

The web formed according to solution casting and having a residual solvent amount falling within a specific range can be stretched without being heated. However, when the film is stretched while being dried, the process is shortened, which is preferable. That is, the stretching process may be performed in the presence of residual solvent, or the stretching process may be performed after drying. However, when the temperature of the web is too high, the plasticizer volatilizes, and therefore, the temperature range is preferably room temperature (15° C.) to 145° C. or below.

When the web is biaxially stretched in mutually perpendicular directions, the film refractive indices Nx, Ny and Nz are readily adjusted to be within a desired range. For example, when the film is stretched in the casting direction, and the shrinkage in the width direction is too large, the value Nz increases too much. In this case, the problem can be solved by limiting the width shrinkage of the film or by stretching the film in the width direction.

When the film is stretched in the width direction, the film may have a refractive index distribution in the width direction. The distribution may occur, for example, when a tenter method is used. This is a phenomenon to be caused by the generation of the shrinking force in the center portion of the film by stretching the film in the width direction while the edges of the film are fixed. This phenomenon is considered as a so-called bowing phenomenon. Even in this case, the bowing phenomenon can be limited by stretching the film in the casting direction, and thereby the retardation distribution in the width direction can be reduced.

The thickness variation in the film to be obtained can be reduced by biaxially stretching the film in mutually perpendicular directions. When the thickness variation in the optical film is too large, the retardation unevenness thereof occurs. The thickness variation in the optical film is preferably within a range of ±3%, and more preferably within a range of ±1%.

For the above-mentioned objects, the method for biaxially stretching the web in the directions perpendicular to each other is effective. The biaxially stretching magnification in the directions perpendicular to each other is preferably 1.2 to 2.0 times and 0.7 to 1.0 times, respectively. Herein, the stretching by 0.7 to 1.0 times means that the interval between the clips or the pins supporting the film is set to 0.7 to 1.0 times the interval therebetween before the stretching.

In general, when the film is stretched in the width direction by 1.2 to 2.0 times, using a biaxial stretching tenter, a shrinking force acts on the perpendicular direction thereof, that is, on the longitudinal direction of the film. Accordingly, when the film is continuously stretched while applying a force only in one direction, the film shrinks in the direction perpendicular to the one direction. This means that the shrinking amount is limited without controlling the width of the film, and the interval between the clips or the pins for width control is controlled to 0.7 to 1.0 times over the interval therebetween before stretching. A force of shrinking the film occurs in the longitudinal direction according to the stretching in the width direction. The interval between the clips or the pins in the longitudinal direction prevents any unnecessary tension from being applied to the film in the longitudinal direction.

The method for stretching the web is not particularly limited. Examples thereof include a method for providing a plurality of rolls each running at a different peripheral speed and stretching the film in the longitudinal direction utilizing the peripheral speed difference between the rolls; a method for holding both sides of the web with clips or pins and expanding the interval between the clips or pins in the progressing direction to stretch the film in the longitudinal direction; a method for similarly expanding the interval therebetween in the width direction to stretch the film in the width direction; and a method for simultaneously expanding the interval both in the longitudinal and width directions to stretch the film in both the longitudinal and width directions. These methods may be combined. That is, the film may be stretched in the width direction relative to the film-forming direction, may be stretched in the longitudinal direction, or may be stretched in both the directions. Further, when the film is stretched in both the directions, the film may be simultaneously stretched or successively stretched.

In the so-called tenter method, preferably, the clip parts are driven according to a linear driving system, and thereby the film can be smoothly stretched with little risk of breaking or the like.

The stretched film may be stretched again. The film is preferably stretched again from the viewpoint of development of optical characteristics, particularly from the viewpoint of an enlargement of the development window of optical characteristics achieved by the reduction in the Nz factor or the like.

[Polarizing Plate]

Since the retardation film of the present invention develops high optical characteristics, the retardation film is preferably used for a polarizing plate protective film. The polarizing plate is formed by laminating a protective film on at least one surface of a polarizer. Any of the polarizers known in the art may be used. For example, the polarizer is a film formed by treating a hydrophilic polymer film such as a polyvinyl alcohol film with a dichroic dye such as iodine, and stretching the film.

The retardation film of the present invention is laminated to the polarizer without being particularly limited. The retardation film can be laminated to the polarizer by using an adhesive containing an aqueous solution of a water-soluble polymer. As the water-soluble polymer adhesive, an aqueous solution of completely-saponified polyvinyl alcohol is preferably used.

The polarizing plate including the polarizing plate protective film of the present invention is excellent in the low deterioration under high-temperature high-humidity condition, and therefore can maintain stable performance for a long period of time.

[Liquid Crystal Display Device]

In general, a liquid crystal display device includes a constitution of polarizing plate protective film (F1)/polarizer 1/polarizing plate protective film (F2)/liquid crystal cell/polarizing plate protective film (F3)/polarizer 2/polarizing plate protective film (F4). The liquid crystal cell carries a liquid crystal between two electrode substrates.

The retardation film of the present invention and the polarizing plate including the retardation film can be used for liquid crystal display devices of liquid crystal cells of various display modes. Examples of kinds of the liquid crystal cells include TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic). VA (Vertically Aligned), and HAN (Hybrid Aligned Nematic).

The OCB-mode liquid crystal cell is a bend-alignment mode liquid crystal cell, in which rod-shaped liquid-crystal molecules in the upper part of the liquid crystal cell and those in the lower part thereof are aligned in the direction substantially oppositely (symmetrically) to each other. The OCB-mode liquid crystal cell is disclosed in U.S. Pat. Nos. 4,583,825 and 5,410,422. Since the rod-shaped liquid-crystal molecules are aligned symmetrically between the upper part and lower part of the liquid crystal cell, the bend-alignment mode liquid crystal cell has a self-optically compensating function. The bend-alignment mode liquid-crystal display device has the advantage of a rapid response speed.

In the VA-mode liquid crystal cell, rod-shaped liquid crystal molecules are substantially vertically aligned under no voltage application. The VA-mode liquid crystal cell includes (2), (3) and (4) in addition to (1): (1) a VA-mode liquid crystal cell in a narrow sense, in which rod-shaped liquid crystal molecules are substantially vertically aligned under no voltage application and substantially horizontally aligned under voltage application (described in Japanese Patent Application Laid-Open No. 2-176625); (2) a VA-mode (MVA-mode) liquid crystal cell multidomained in order to enlarge a viewing angle (described in SID 97, Digest of Tech. Papers (preliminary drafts) 28 (1997), 845); (3) a liquid crystal cell of a mode (an n-ASM mode) in which rod-shaped liquid crystal molecules are substantially vertically aligned under no voltage application and aligned in twisted multi-domains under voltage application (Sharp Technical Journal, No. 80, p. 11): and (4) a liquid crystal cell of SURVAIVAL mode (Monthly DISPLAY, May, p. 14 (1999)).

Any one of the polarizing plate protective films F1 to F4 in the liquid crystal display device may be the retardation film of the present invention. That is, in one example of the liquid crystal display device, the retardation film of the present invention is disposed between the liquid crystal cell and one polarizing plate, or two retardation films of the present invention are disposed between the liquid crystal cell and both polarizing plates. That is, the liquid crystal display device can include, for example, (1) a constitution of polarizing plate protective film/polarizer/polarizing plate protective film/liquid crystal cell/film of the present invention/polarizer/polarizing plate protective film, or (2) a constitution of polarizing plate protective film/polarizer/film of the present invention/liquid crystal cell/film of the present invention/polarizer/polarizing plate protective film.

The liquid crystal cell of the liquid crystal display device may be a liquid crystal cell of TN-mode, VA-mode, OCB-mode or the like. The display device excellent in a viewing angle and visibility with little coloration can be provided by combining the polarizing plate including the retardation film of the present invention with the liquid crystal cell. Since the retardation film of the present invention has comparatively high retardation, the retardation film can be preferably combined with a VA-mode liquid crystal cell.

In another embodiment of a transmission-type liquid crystal display device of the present invention, an optically-compensatory sheet including the film of the present invention is used as the transparent protective film of the polarizing plate to be disposed between the liquid crystal cell and the polarizer. The optically-compensatory sheet may be used for only the protective film for one polarizing plate (between the liquid crystal cell and the polarizer), or the optically-compensatory sheet may be used for the two protective films for both the polarizing plates (between the liquid crystal cell and the polarizer). When the optically-compensatory sheet is used only for one polarizing plate, the sheet is particularly preferably used as protective film located on the liquid crystal cell side of the backlight-side polarizing plate of the liquid crystal cell.

The polarizing plate protective film other than the retardation film of the present invention may be any common cellulose acylate film. The thickness of the common cellulose acylate film is preferably thinner than that of the retardation film of the present invention. For example, the thickness is preferably 40 to 80 μm. Examples of the common cellulose acylate film include, but not limited to, commercially-available KC4UX2M (manufactured by Konica Opto Corporation, 40 μm). KC5UX (manufactured by Konica Opto Corporation, 60 μm), and TD80 (manufactured by FUJIFILM Corporation, 80 μm).

EXAMPLES

Hereinafter, the present invention will be described more specifically with reference to Examples and Comparative Examples. In the following Examples, the materials, the used amounts, the ratios, the details of the treatment, and the treatment procedure or the like may appropriately be modified without departing from the spirit of the present invention. Accordingly, the scope of the present invention should not be limitatively interpreted by specific examples to be illustrated below.

Hereinafter, cellulose acetates used in Examples will be illustrated.

TABLE 1

| Polymer names | Degree of acetyl substitution 1 (low substitution degree component) | Degree of acetyl substitution 2 (high substitution degree component) | Content ratio, low substitution degree component/ high substitution degree component (weight ratio) | Weight average molecular weight (MW) |
|---|---|---|---|---|
| Cellulose acetate A | 2.1 | 2.45 | 3/97 | 185,000 |
| Cellulose acetate B | 2.0 | 2.3 | 4/96 | 170,000 |
| Cellulose acetate C | 1.9 | 2.5 | 3/97 | 190,000 |
| Cellulose acetate D | — | 2.4 | 0/100 | 180,000 |
| Cellulose acetate E | 2.0 | 2.6 | Unmeasured | 200,000 |
| Cellulose acetate F | — | 2.9 | 0/100 | 300,000 |

In Table 1,
"degree of acetyl substitution 1" represents a degree of acetyl substitution of a low substitution degree component (cellulose acetate α); and
"degree of acetyl substitution 2" represents a degree of acetyl substitution of a high substitution degree component (cellulose acetate β).
"Content ratio" represents a mass ratio of the low substitution degree component to the high substitution degree component (low substitution degree component/high substitution degree component).

The cellulose acetates of Table 1 were subjected to liquid chromatography using the following measurement conditions. The chromatography results of cellulose acetate A, cellulose acetate B, and cellulose acetate D are illustrated in FIG. 1.

Liquid Chromatograph Conditions

Apparatus: evaporation light-scattering detection system (manufactured by Shimadzu Corporation)
Eluting solution: (A) chloroform/methanol (9/1, volume ratio), (B) methanol/water (8/1, volume ratio), (A/B) 20/80(0 minute) to 100/0 (28 minutes)
Flow rate: 0.7 ml/minute
Detector: evaporative light scattering detector
Evaporation temperature 75° C.
Nebulizer temperature 60° C.
Nitrogen pressure 30 psi
Column temperature 30° C.
Injection volume: 20 μl
Sample dissolution: adjusted to 0.1% with eluting solution (A)

In FIG. 1, the horizontal axis represents a retention time (minute), and the vertical axis represents intensity (–) of a peak. As illustrated in FIG. 1, it is found that both the cellulose acetates A and B have a minute peak in a range in which the retention time is less than 5 minutes, and a main peak in a range in which the retention time is 5 to 20 minutes. On the other hand, it is found that the cellulose acetate D has a main peak in the range in which the retention time is 5 to 20 minutes, but the cellulose acetate D has no peak in the range in which the retention time is less than 5 minutes. From these results, it is suggested that the peak in the range in which the retention time is less than 5 minutes is derived from the low substitution degree component of the cellulose acetate (the cellulose acetate α having a degree of acetyl substitution of 2.1 or less); and the peak in the range in which the retention time is 5 to 20 minutes is derived from the high substitution degree component of the cellulose acetate (the cellulose acetate 3 having a degree of acetyl substitution of 2.3 to 2.5). The ratio of the area of the peak in the range in which the retention time is less than 5 minutes to the area of the peak in the range in which the retention time is 5 to 20 minutes is considered to correspond to the content ratio of the low substitution degree component to the high substitution degree component.

<Production of Retardation Film 101>
<Fine Particle Dispersion Liquid 1>

11 parts by weight of fine particles (Aerosil R972V manufactured by Nippon Aerosil Co., Ltd.) and 89 parts by weight of ethanol were mixed with stirring for 50 minutes with a dissolver and then dispersed with Manton Gaulin.

<Fine Particle-Added Liquid 1>

5 parts by weight of fine particle dispersion liquid 1 was slowly added to 99 parts by weight of methylene chloride being stirred in a dissolution tank. The fine particle dispersion liquid was further dispersed by an Attritor so that the particle diameter of the secondary particles had a predetermined size. The dispersion was filtered by a Fine Met NF manufactured by Nippon Seisen Co., Ltd., to prepare fine particle-added liquid 1.

Next, a main dope liquid having the following composition was prepared. First, methylene chloride and ethanol were charged into a pressurized dissolution tank. Cellulose acetate A was charged into the pressurized dissolution tank containing the solvent with stirring. The mixture was heated under stirring to completely dissolve the mixture. The obtained solution was filtered using Azumi filter paper No. 244 manufactured by Azumi Filter Paper Co., Ltd., to prepare a main dope liquid.

<Composition of Main Dope Liquid>
Methylene chloride: 340 parts by weight
Ethanol: 64 parts by weight
Cellulose acetate A: 100 parts by weight
Compound 28 (Van der Waals volume: 848): 6.0 parts by weight
Compound A: 2.0 parts by weight
Compound D: 2.0 parts by weight
Fine particle-added solution 1:1 part by weight
(Compound A: trimethylolpropane tribenzoate, Compound D: ethyl phthalyl ethyl glycolate)

The materials were charged into a sealed vessel, and dissolved under stirring, to prepare a dope. The dope was cast on a stainless steel support at a temperature of 35° C. The temperature of the stainless steel belt was controlled at 30° C.

The solvent was evaporated until a residual solvent amount in the film cast on the stainless steel belt support amounted to 75%. Then, the film was peeled off the stainless steel belt support at a peeling tension of 150 N/m, to obtain a web. The web obtained by peeling was stretched by 37% in the width direction under heating at 155° C. by using a tenter. The residual solvent at the start of the stretching was 10%.

The stretched film was dried while the film was conveyed on a number of rolls through a drying zone. The drying temperature was set to 140° C. and the conveyance tension was set to 100 N/m. Retardation film 101 having a dried film thickness of 40 μm was obtained as described above.

Hereinafter, retardation films 102 to 108 and 110 to 115 were produced in almost the same manner as in that of retardation film 101 except that components and residual solvent amounts during stretching were changed as illustrated in Table 2. Retardation films 109 and 116 to 123 were produced as Comparative Examples. Among these, retardation film 109 is used as a protective film. Therefore, in the production of retardation film 109, the components were changed as illustrated in Table 2, and stretching was not performed. Compounds A to D as a plasticizer in Table 2 are as follows.

(Plasticizers)
Compound A: trimethylolpropane tribenzoate
Compound B: triphenyl phosphate
Compound C: bisphenyl biphenyl phosphate
Compound D: ethyl phthalyl ethyl glycolate
(UV absorbent)
TINUVIN 928 (manufactured by Ciba Japan K.K.)
Measurement of Birefringenceretardation (Re)

The birefringence retardations (Re) of retardation films 101 to 123 were determined at a wavelength of 590 nm on conditions of temperature of 23° C. and humidity of 55% RH using KOBRA-21ADH (manufactured by Oji Scientific Instruments). The obtained results are illustrated in Table 2.

TABLE 2

| Retardation film No. | Cellulose acetate | Plasticizer 1 | | Plasticizer 2 | | Compound having Van der Waals volume of 500 to 1,000 | | |
|---|---|---|---|---|---|---|---|---|
| | | Compound | Addition amount (parts by weight) | Compound | Addition amount (parts by weight) | Compound | Van der Waals volume | Addition amount (parts by weight) |
| 101 | A | A | 2.0 | D | 2.0 | 28 | 848 | 6.0 |
| 102 | A | A | 2.0 | D | 2.0 | 28 | 848 | 6.0 |
| 103 | C | A | 1.0 | B | 2.0 | 28 | 848 | 8.0 |
| 104 | C | A | 1.0 | B | 2.0 | 28 | 848 | 8.0 |
| 105 | A | A | 5.0 | B | 2.0 | 1 | 504 | 10.0 |
| 106 | A | A | 5.0 | B | 2.0 | 1 | 504 | 10.0 |
| 107 | B | A | 5.0 | B | 2.0 | 23 | 997 | 6.0 |
| 108 | B | A | 5.0 | B | 2.0 | 23 | 997 | 6.0 |
| 109 | F | A | 5.0 | B | 5.0 | — | — | — |
| 110 | A | A | 2.0 | B | 2.0 | 71 | 765 | 5.0 |
| 111 | A | A | 2.0 | B | 2.0 | 71 | 765 | 5.0 |
| 112 | A | A | 2.0 | B | 2.0 | 60 | 615 | 6.0 |
| 113 | A | A | 2.0 | B | 2.0 | 60 | 615 | 6.0 |
| 114 | A | A | 2.0 | B | 2.0 | 45 | 833 | 6.0 |
| 115 | A | A | 2.0 | B | 2.0 | 45 | 833 | 6.0 |
| 116 | A | A | 5.0 | B | 5.0 | — | — | — |
| 117 | A | A | 5.0 | B | 5.0 | — | — | — |
| 118 | E | A | 2.0 | B | 4.0 | 51 | 571 | 5.0 |
| 119 | E | A | 2.0 | B | 4.0 | 51 | 571 | 5.0 |
| 120 | D | B | 4.0 | D | 4.0 | 28 | 848 | 2.0 |
| 121 | D | B | 4.0 | D | 4.0 | 28 | 848 | 2.0 |

TABLE 2-continued

| | | | | | | | | |
|---|---|---|---|---|---|---|---|---|
| 122 | A | C | 6.0 | D | 4.0 | — | — | — |
| 123 | A | C | 6.0 | D | 4.0 | — | — | — |

| Retardation film No. | UV absorbent Addition amount (parts by weight) | Re developing property | | ΔRe/Δresidual solvent amount during stretching | Remarks |
|---|---|---|---|---|---|
| | | Re | Residual solvent amount during stretching | | |
| 101 | — | 50 nm | 10% | — | Example |
| 102 | — | 54 nm | 8% | 2 nm/% | Example |
| 103 | — | 52 nm | 10% | — | Example |
| 104 | — | 58 nm | 8% | 3 nm/% | Example |
| 105 | — | 50 nm | 10% | — | Example |
| 106 | — | 53 nm | 8% | 1.5 nm/% | Example |
| 107 | — | 48 nm | 10% | — | Example |
| 108 | — | 50 nm | 8% | 1 nm/% | Example |
| 109 | 1.0 | — | — | — | Comparative Example |
| 110 | — | 50 nm | 10% | — | Example |
| 111 | — | 56 nm | 7% | 2 nm/% | Example |
| 112 | — | 50 nm | 10% | — | Example |
| 113 | — | 55 nm | 8% | 2.5 nm/% | Example |
| 114 | — | 51 nm | 9% | — | Example |
| 115 | — | 54 nm | 8% | 3 nm/% | Example |
| 116 | — | 46 nm | 10% | — | Comparative Example |
| 117 | — | 56 nm | 8% | 5 nm/% | Comparative Example |
| 118 | — | 42 nm | 10% | — | Comparative Example |
| 119 | — | 49 nm | 8% | 3.5 nm/% | Comparative Example |
| 120 | — | 49 nm | 10% | — | Comparative Example |
| 121 | — | 55 nm | 8% | 3 nm/% | Comparative Example |
| 122 | — | 46 nm | 10% | — | Comparative Example |
| 123 | — | 55 nm | 8% | 4.5 nm/% | Comparative Example |

As illustrated in Table 2, it is found that the retardation Re of the film containing a compound having a van der Waals volume of 500 Å$^3$ to 1,000 Å$^3$ is less likely to vary even when the residual solvent amount in the film (web) before stretching changes. For example, when retardation film 101 is compared with retardation film 102, whereas the residual solvent amount of retardation film 101 is different from that of retardation film 102 by 2%, the retardation Re varies by 4 nm (2 nm/%). On the other hand, when retardation film 116 is compared with retardation film 117, whereas the residual solvent amount of retardation film 116 is different from that of retardation film 117 by 2%, the retardation Re varies by 10 nm (5 nm/%).

<Production of Hard Coat Film>

A mixture of 6.0 parts by weight of a polyester urethane resin (manufactured by Toyobo Co., Ltd., trade name "Byron UR1350", solid content concentration: 33% (toluene/methyl ethyl ketone solvent=65/35)), 30 parts by weight of pentaerythritol triacrylate, 30 parts by weight of pentaerythritol tetraacrylate, 3.0 parts by weight of Irgacure 184 (manufactured by Ciba Japan K.K., photopolymerization initiator), 1.0 part by weight of Irgacure 907 (manufactured by Ciba Japan K.K., photopolymerization initiator), 2.0 parts by weight of polyether-modified polydimethylsiloxane (BYK-UV3510 manufactured by BYK Japan KK), 150 parts by weight of propylene glycol monomethyl ether, and 150 parts by weight of methyl ethyl ketone was stirred to produce a hard coat layer coating composition. The amount of the polyester urethane resin contained in 6.0 parts by weight of the polyester urethane resin was 2.0 parts by weight.

The obtained hard coat layer coating composition was filtered through a polypropylene filter having a pore size of 0.4 μm to prepare a hard coat layer coating solution. The hard coat layer coating solution was applied on retardation film 109 (protective film) using a micro gravure coater, and then dried at 80° C. After drying, the coated layer was cured by using an ultraviolet lamp with the illuminance of an irradiation part set to 80 mW/cm$^2$ and an irradiation amount set to 80 mJ/cm$^2$, to form a hard coat layer having a dry film thickness of 9 μm. Then, the film was rolled up in a roll of hard coat film.

<Production of Viewing Side Polarizing Plate 201>
(a) Production of Polarizer 100 parts by weight of polyvinyl alcohol (hereafter, abbreviated as PVA) having a saponification degree of 99.95 mol % and a polymerization degree of 2,400 was impregnated with 10 parts by weight of glycerin and 170 parts by weight of water, and the resultant was melted, kneaded, and was subjected to a defoaming treatment. Subsequently, the resultant melted liquid was extruded on a metal roll from a T die so as to form a film. Then, the film was dried and subjected to a heat treatment, to obtain a PVA film.

The obtained PVA film has an average thickness of 25 μm, a moisture percentage of 4.4% and a width of 3 m. Next, the obtained PVA film was continuously processed by in order of preliminary swelling, dyeing, uniaxial stretching by a wet method, a fixing treatment, drying, and a heat treatment, to produce a polarizing film. This is, preliminary swelling was conducted in such a way that the PVA film was immersed in water at 30° C. for 30 seconds. Then, the PVA film was immersed in an aqueous solution having an iodine concentration of 0.4 g/liter and a potassium iodide concentration of 40 g/liter at 35° C. for 3 minutes. Subsequently, the film was uniaxially stretched to 6 times in an aqueous solution having a boric acid concentration of 4% at 50° C. under the condition that a tension applied to the film was 700 N/m. Then, the fixing treatment was conducted in such a way that the film was immersed in an aqueous solution having a potassium iodide concentration of 40 g/liter, a boric acid concentration of 40 g/liter and a zinc chloride concentration of 10 g/liter at 30° C. for 5 minutes. Thereafter, the PVA film was taken out, dried with hot air of 40° C. and further subjected to a heat treatment at 100° C. for 5 minutes. The obtained polarizing film had an average thickness of 13 μm, and as a polarizing performance, a transmittance of 43.0%, a polarization degree of 99.5% and a dichroic ratio of 40.1.

(b) Production of Viewing Side Polarizing Plate

In accordance with the following processes 1 to 4, the polarizer, retardation film 101, and the hard coat film were laminated to each other, to produce polarizing plate 201.

Process 1: The polarizer was immersed in a storage tank containing a polyvinyl alcohol adhesive solution having a solid content of 2 wt % for 1 to 2 seconds.

Process 2: Retardation film 101 and the hard coat film were subjected to an alkaline saponification treatment on the following conditions.

(Alkaline Saponification Treatment)
Saponification process: 1.5 M-KOH, 50° C. 45 seconds
Rinse process: water, 30° C., 60 seconds
Neutralization process: 10 parts by weight of HCl, 30° C., 45 seconds
Rinse process: water, 30° C., 60 seconds After the saponification treatment, rinse, neutralization, and rinse processes were conducted in that order, then the films were dried at 100° C.

The excessive adhesive adhered to the polarizing film immersed in the polyvinyl alcohol adhesive solution at Process 1 was then lightly removed, and the polarizing film was sandwiched between retardation film 101 and the hard coat film, to form a laminate.

Process 3: The components of the laminate were laminated together by two rotating rollers with a pressure of 20 to 30 N/cm² at a speed of about 2 m/minutes. This process was conducted with care not to allow entry of air bubbles.

Process 4: The sample produced at Process 3 was dried at 80° C. in a dryer for 5 minutes, to produce polarizing plates.

Process 5: A commercially-available acrylic pressure-sensitive adhesive agent was applied on retardation film 101 of the polarizing plate produced at Process 4 such that a dried layer thickness became 25 μm, and dried with an oven at a temperature of 110° C. for 5 minutes so as to form a pressure-sensitive adhesive layer. The protective film having releasability was stuck on the pressure-sensitive adhesive layer. The polarizing plate was cut into (punching) a size of 576×324 mm, to produce polarizing plate 201.

<Production of Viewing Side Polarizing Plates 201 to 222>

Polarizing plates 202 to 222 were produced in the same manner as in the production of viewing side polarizing plate 201 except that retardation film 101 was changed to retardation films 102 to 108 and retardation films 110 to 123, respectively.

<Production of Backlight Side Polarizing Plate 223>

In the same manner as in the production of the viewing side polarizing plate, the polarizer, retardation film 101, and retardation film 109 were laminated to each other, to produce polarizing plate 223.

<Production of Backlight Side Polarizing Plates 224 to 244>

Polarizing plates 224 to 244 were produced in the same manner as in the production of polarizing plate 223 except that retardation film 101 was changed to retardation films 102 to 108 and retardation films 110 to 123, respectively.

a. Observation of Deformation Defect

Polarizing plates 201 to 244 subjected to an endurance test (polarizing plates 201 to 244 were left on the conditions of 60° C. and 90% RH for 100 hours, and then returned to the conditions of 23° C. and 55% RH) were observed from retardation film 109 (protective film) side, and the status of deformation defect was observed based on the following criteria.

A: No deformation defect was observed at all.
B: Although deformation defect is observed at a few parts, there is no problem in practical use.
C: Deformation defect is observed on some parts, and there is a problem in practical use.
D: The occurrence of partial deformation defect is observed clearly with the observation from a distance.

b. Evaluation of Adhesion

Using a cutter knife, the surface of each of polarizing plates 201 to 244 on the side having the retardation film was cross-cut to give 11 vertical cuts and 11 horizontal cuts, to form 100 square cross-cuts in total. A pressure-sensitive adhesive polyester tape "No. 31B" manufactured by Nitto Denko Corporation was stuck to the surface under pressure, and the pressure-sensitive adhesive tape was then peeled off. The presence or absence of peeling of the retardation film from the polarizer was visually observed. Evaluation was performed on the following criteria.

A: No peeling was observed in the 100 square cross-cuts at all.
B: Peeling was observed in 2 or less of the 100 square cross-cuts.
C: Peeling was observed in 3 to 10 of the 100 square cross-cuts.
D: Peeling was observed in more than 10 of the 100 square cross-cuts.

The evaluation results of the polarizing plates are illustrated in Tables 3 and 4.

TABLE 3

| Viewing side hard coat film | Liquid crystal cell side retardation film No. | Viewing side polarizing plate No. | Deformation detect | Adhesion | Remarks |
|---|---|---|---|---|---|
| Hard coat film | Retardation film 101 | Polarizing plate 201 | A | A | Example |
| Hard coat film | Retardation film 102 | Polarizing plate 202 | B | B | Example |
| Hard coat film | Retardation film 103 | Polarizing plate 203 | B | B | Example |
| Hard coat film | Retardation film 104 | Polarizing plate 204 | A | A | Example |

TABLE 3-continued

| Viewing side hard coat film | Liquid crystal cell side retardation film No. | Viewing side polarizing plate No. | Deformation detect | Adhesion | Remarks |
|---|---|---|---|---|---|
| Hard coat film | Retardation film 105 | Polarizing plate 205 | A | A | Example |
| Hard coat film | Retardation film 106 | Polarizing plate 206 | A | A | Example |
| Hard coat film | Retardation film 107 | Polarizing plate 207 | A | A | Example |
| Hard coat film | Retardation film 108 | Polariziag plate 208 | B | B | Example |
| Hard coat film | Retardation film 109 | Polariziag plate 209 | B | B | Example |
| Hard coat film | Retardation film 110 | Polarizing plate 210 | B | B | Example |
| Hard coat film | Retardation film 111 | Polarizing plate 211 | B | B | Example |
| Hard coat film | Retardation film 112 | Polariziag plate 212 | A | A | Example |
| Hard coat film | Retardation film 113 | Polariziag plate 213 | A | A | Example |
| Hard coat film | Retardation film 114 | Polarizing plate 214 | A | A | Example |
| Hard coat film | Retardation film 116 | Polarizing plate 215 | B | C | Comparative Example |
| Hard coat film | Retardation film 117 | Polarizing plate 216 | B | C | Comparative Example |
| Hard coat film | Retardation film 118 | Polarizing plate 217 | C | C | Comparative Example |
| Hard coat film | Retardation film 119 | Polarizing plate 218 | C | C | Comparative Example |
| Hard coat film | Retardation film 120 | Polarizing plate 219 | D | D | Comparative Example |
| Hard coat film | Retardation film 121 | Polarizing plate 220 | D | D | Comparative Example |
| Hard coat film | Retardation film 122 | Polarizing plate 221 | C | B | Comparative Example |
| Hard coat film | Retardation film 123 | Polarizing plate 222 | C | B | Comparative Example |

TABLE 4

| Liquid crystal cell side retardation film No. | Backlight side protective film No. | Backlight side polarizing plate No. | Deformation defect | Adhesion | Remarks |
|---|---|---|---|---|---|
| Retardation film 101 | Retardation film 109 | Polarizing plate 223 | A | A | Example |
| Retardation film 102 | Retardation film 109 | Polarizing plate 224 | B | B | Example |
| Retardation film 103 | Retardation film 109 | Polarizing plate 225 | B | B | Example |
| Retardation film 104 | Retardation film 109 | Polarizing plate 226 | A | A | Example |
| Retardation film 105 | Retardation film 109 | Polarizing plate 227 | A | A | Example |
| Retardation film 106 | Retardation film 109 | Polarizing plate 228 | A | A | Example |
| Retardation film 107 | Retardation film 109 | Polarizing plate 229 | A | A | Example |
| Retardation film 108 | Retardation film 109 | Polarizing plate 230 | B | B | Example |
| Retardation film 110 | Retardation film 109 | Polarizing plate 231 | B | B | Example |
| Retardation film 111 | Retardation film 109 | Polarizing plate 232 | B | B | Example |
| Retardation film 112 | Retardation film 109 | Polarizing plate 233 | B | B | Example |
| Retardation film 113 | Retardation film 109 | Polarizing plate 234 | A | A | Example |
| Retardation film 114 | Retardation film 109 | Polarizing plate 235 | A | A | Example |
| Retardation film 115 | Retardation film 109 | Polarizing plate 236 | A | A | Example |
| Retardation film 116 | Retardation film 109 | Polarizing plate 237 | B | C | Comparative Example |
| Retardation film 117 | Retardation film 109 | Polarizing plate 238 | B | C | Comparative Example |
| Retardation film 118 | Retardation film 109 | Polarizing plate 239 | C | C | Comparative Example |
| Retardation film 119 | Retardation film 109 | Polarizing plate 240 | C | C | Comparative Example |
| Retardation film 120 | Retardation film 109 | Polarizing plate 241 | D | D | Comparative Example |
| Retardation film 121 | Retardation film 109 | Polarizing plate 242 | D | D | Comparative Example |
| Retardation film 122 | Retardation film 109 | Polarizing plate 243 | C | B | Comparative Example |
| Retardation film 123 | Retardation film 109 | Polarizing plate 244 | C | B | Comparative Example |

<Production of Liquid Crystal Display Device 401>

A polarizing plate of a liquid crystal panel (VA-mode liquid crystal panel) of a 40-inch display KDL-40V5 manufactured by Sony Corporation was removed, and polarizing plate 201 was installed as the polarizing plate at the viewing side such that the hard coat layer was placed at the viewing side, and the pressure-sensitive adhesive layer was laminated on liquid crystal cell glass. At the back light side, polarizing plate 223 was laminated on the liquid crystal cell glass by use of an acrylic pressure-sensitive adhesive agent having a thickness of 25 μm. In this way liquid crystal panel 301 was produced. Next, liquid crystal panel 301 was installed on a liquid crystal television to produce a liquid crystal display device 401.

<Production of Liquid Crystal Display Devices 402 to 422>

Liquid crystal display devices 402 to 422 were produced in the same manner as in the production of liquid crystal display device 401 except that viewing side polarizing plate 201 was changed to polarizing plates 202 to 222, and backlight side polarizing plate 223 was changed to polarizing plates 224 to 244, respectively, as illustrated in Table 5.

<<Evaluation of Streak>>

In order to check deterioration by heat for the above-produced liquid crystal display devices 401 to 422, the liquid crystal display devices were treated for 300 hours on the condition of 60° C., and thereafter, were returned to the condition of 23° C. and 55% RH. Then, at two hours after the power source switch was put in service to turn on the back light, streaks at the time of the black indication were visually checked and evaluated based on the following criteria. Streaks with the rank of A or B are evaluated as no problem for practical use.

A: no streak
B: Weak streaks existed at the central potion.
C: Weak streaks existed from the central potion to the edge portions.
D: Strong streaks existed on the entire surface.

<<Evaluation of Visibility>>

The above-produced liquid crystal display devices were left for 100 hours on the conditions of 60° C. and 90% RH, and thereafter, returned to the condition of 23° C. and 55% RH. Subsequently, the surfaces of the display devices were visually observed and evaluated based on the following criteria.

A: No wavy unevenness was observed on the surface.
B: Wavy unevenness was slightly observed on the surface.
C: Fine wavy unevenness was slightly observed on the surface.
D: Fine wavy unevenness was observed on the surface.

The above evaluation results are illustrated in the following Table 5.

TABLE 5

| Viewing side polarizing plate No. | Backlight side polarizing plate No. | Liquid crystal display device No. | Visibility | Streak | Remarks |
|---|---|---|---|---|---|
| Polarizing plate 201 | Polarizing plate 223 | Liquid crystal display device 401 | A | A | Example |
| Polarizing plate 202 | Polarizing plate 224 | Liquid crystal display device 402 | A | A | Example |
| Polarizing plate 203 | Polarizing plate 225 | Liquid crystal display device 403 | A | A | Example |
| Polarizing plate 204 | Polarizing plate 226 | Liquid crystal display device 404 | A | A | Example |
| Polarizing plate 205 | Polarizing plate 227 | Liquid crystal display device 405 | B | A | Example |
| Polarizing plate 206 | Polarizing plate 228 | Liquid crystal display device 406 | B | A | Example |
| Polarizing plate 207 | Polarizing plate 229 | Liquid crystal display device 407 | A | B | Example |
| Polarizing plate 208 | Polarizing plate 230 | Liquid crystal display device 408 | A | B | Example |
| Polarizing plate 209 | Polarizing plate 231 | Liquid crystal display device 409 | B | B | Example |
| Polarizing plate 210 | Polarizing plate 232 | Liquid crystal display device 410 | B | B | Example |
| Polarizing plate 211 | Polarizing plate 233 | Liquid crystal display device 411 | A | A | Example |
| Polarizing plate 212 | Polarizing plate 234 | Liquid crystal display device 412 | A | A | Example |
| Polarizing plate 213 | Polarizing plate 235 | Liquid crystal display device 413 | B | B | Example |
| Polarizing plate 214 | Polarizing plate 236 | Liquid crystal display device 414 | B | B | Example |
| Polarizing plate 215 | Polarizing plate 237 | Liquid crystal display device 415 | C | D | Comparative Example |
| Polarizing plate 216 | Polarizing plate 238 | Liquid crystal display device 416 | D | D | Comparative Example |
| Polarizing plate 217 | Polarizing plate 239 | Liquid crystal display device 417 | C | C | Comparative Example |
| Polarizing plate 218 | Polarizing plate 240 | Liquid crystal display device 418 | C | C | Comparative Example |
| Polarizing plate 219 | Polarizing plate 241 | Liquid crystal display device 419 | B | C | Comparative Example |
| Polarizing plate 220 | Polarizing plate 242 | Liquid crystal display device 420 | B | C | Comparative Example |
| Polarizing plate 221 | Polarizing plate 243 | Liquid crystal display device 421 | B | B | Comparative Example |
| Polarizing plate 222 | Polarizing plate 244 | Liquid crystal display device 422 | B | B | Comparative Example |

As can be understood from the results of Tables 3 to 5, the polarizing plate of the present invention prevents deformation defect during storage at high temperatures and high humidity, and exhibits performances excellent in both streak prevention and visibility (clearness) at the time of use for a liquid crystal display device.

The present application claims priority of Japanese Patent Application No. 2011-240155 filed on Nov. 1, 2011, the entire contents of which including the specification and the drawings are herein incorporated by reference.

INDUSTRIAL APPLICABILITY

In the retardation film of the present invention, the width of variation in the retardation value in response to a change in the residual solvent amount of the film during stretching is small. Therefore, in the manufacturing process, it is not necessary to precisely control the residual solvent amount of the film before stretching, which is advantageous in manufacturing. In addition, the surface of the cellulose acetate film is treated with alkali, and thereby the adhesion to the hydrophilic film can be increased. Therefore, the cellulose acetate film is laminated to the polarizer as the retardation film, and suitably used as a polarizing plate.

The invention claimed is:

1. A retardation film comprising:
cellulose acetate α having a degree of acetyl substitution of 2.1 or less, wherein acyl groups contained in the cellulose acetate α consist only of acetyl groups;
cellulose acetate β having a degree of acetyl substitution of 2.3 to 2.5, wherein acyl groups contained in the cellulose acetate β consist only of acetyl groups; and
a compound having a van der Waals volume of 500 Å$^3$ to 1,000 Å$^3$ in an amount of 5 to 10 wt% relative to the total of the cellulose acetate α and the cellulose acetate β,
wherein the retardation film is stretched.

2. The retardation film according to claim 1, wherein the compound having a van der Waals volume of 500 Å$^3$ to 1000 Å$^3$ is a compound represented by any of general formulas (I) to (V):

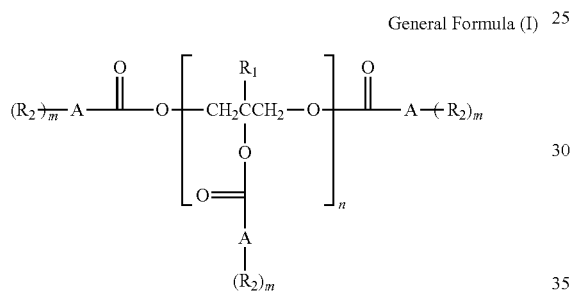

General Formula (I)

wherein A represents an aromatic ring or a cyclohexyl ring; $R_1$ represents a hydrogen atom or an alkyl substituent; $R_2$ represents an alkyl substituent or an aikoxyl substituent; m represents an integer of 0 or more; and n represents 2 to 4,

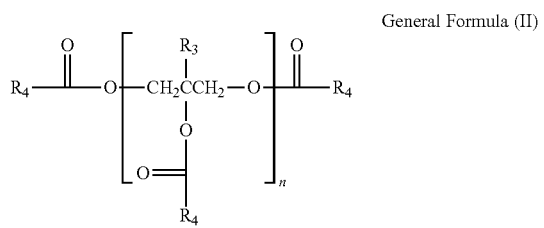

General Formula (II)

wherein $R_3$ represents a hydrogen atom or an alkyl substituent; $R_4$ represents an alkyl substituent; and n represents 2 to 4,

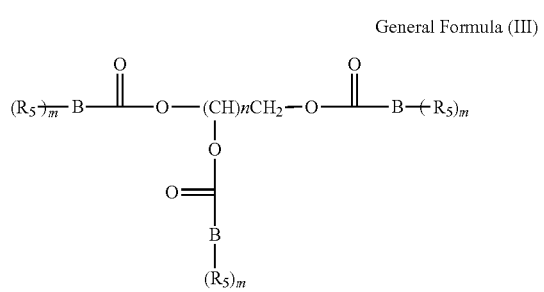

General Formula (III)

wherein B represents an aromatic ring or a cyclohexyl ring; $R_5$ represents an alkyl substituent or an alkoxyl substituent; m represents an integer of 0 or more; and n represents 4 to 6,

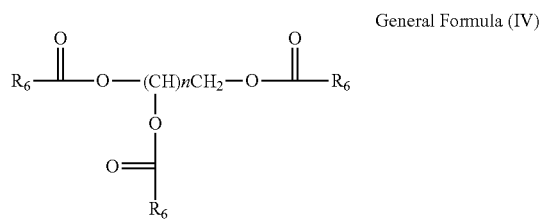

General Formula (IV)

wherein $R_6$ represents an alkyl substituent; and n represents 4 to 6,

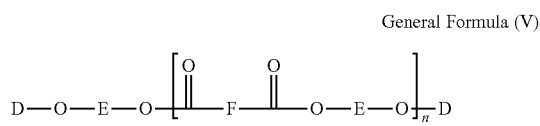

General Formula (V)

wherein D is an aryl carboxylic acid residue, an alkyl carboxylic acid residue, or a hydrogen atom; —O-E-O— represents a $C_{2-12}$ alkylene glycol residue, a $C_{6-12}$ aryl glycol residue, or a $C_{4-12}$ oxyalkylene glycol residue; —OC—F—CO—represents a $C_{4-12}$ alkylene dicarboxylic acid residue or a $C_{6-12}$ aryl dicarboxylic acid residue; and n represents 2 to 4.

3. The retardation film according to claim 1, wherein an in-plane retardation Re measured at a wavelength of 590 nm is 25 nm≤|Re|≤75 nm; and when a decrease amount of Re in the case where a residual solvent amount at the start of stretching is increased by X (%) is defined as Y (nm), Y/X is 1 nm/% to 3 nm/%.

4. The retardation film according to claim 2, wherein an in-plane retardation Re measured at a wavelength of 590 nm is 25 nm≤|Re|≤75 nm; and when a decrease amount of Re in the case where a residual solvent amount at the start of stretching is increased by X (%) is defined as Y (nm), Y/X is 1 nm/% to 3 nm/%.

5. The retardation film according to claim 1, wherein the retardation film has a width of 700 to 3,000 mm.

6. The retardation film according to claim 2, wherein the retardation film has a width of 700 to 3,000 mm.

7. A polarizing plate comprising the retardation film according to claim 1.

8. A liquid crystal display device comprising the retardation film according to claim 1.

9. The retardation film according to claim 1, wherein a content ratio of the cellulose acetate α and the cellulose acetate β is α:β=1:99 to 4:96.

* * * * *